United States Patent
Abbaszadeh et al.

(10) Patent No.: US 12,437,063 B2
(45) Date of Patent: Oct. 7, 2025

(54) UNIFIED MULTI-AGENT SYSTEM FOR ABNORMALITY DETECTION AND ISOLATION

(71) Applicant: General Electric Company, Schenectady, NY (US)

(72) Inventors: Masoud Abbaszadeh, Clifton Park, NY (US); Weizhong Yan, Clifton Park, NY (US); Justin Varkey John, Cohoes, NY (US); Matthew Christian Nielsen, Soctia, NY (US)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 395 days.

(21) Appl. No.: 17/228,162

(22) Filed: Apr. 12, 2021

(65) Prior Publication Data
US 2022/0327204 A1    Oct. 13, 2022

(51) Int. Cl.
G06F 21/32    (2013.01)
G06F 21/55    (2013.01)
G06N 20/00    (2019.01)

(52) U.S. Cl.
CPC .......... G06F 21/554 (2013.01); G06N 20/00 (2019.01); *G06F 2221/034* (2013.01)

(58) Field of Classification Search
CPC ............. G06F 21/554; G06F 2221/034; G06F 18/2163; G06N 20/00; H04L 63/1425
See application file for complete search history.

(56) References Cited

U.S. PATENT DOCUMENTS 7,305,371 B2    12/2007    Brueckner et al.
8,200,743 B2    6/2012    Lee et al.
(Continued)

FOREIGN PATENT DOCUMENTS

CN    101907088 A    * 12/2010
CN    103001225 B    10/2014
WO    2020/088739 A1    5/2020

OTHER PUBLICATIONS

Renjit, J. Arokia et al., "Multi-Agent-Based Anomaly Intrusion Detection", Information Security Journal: A Global Perspective, 20:4-5, (2011), DOI:10.1080/1939355.2011.589424, ISSN: 1939-3555, (pp. 185-193, 10 total pages).
(Continued)

*Primary Examiner* — Haresh N Patel
(74) *Attorney, Agent, or Firm* — Buckley, Maschoff & Talwalkar LLC

(57) ABSTRACT

According to some embodiments, a system, method and non-transitory computer readable medium are provided comprising a plurality of real-time monitoring nodes to receive streams of monitoring node signal values over time that represent a current operation of the cyber physical system; a local status determination module to determine an anomaly status for one or more nodes; a global status determination module to determine an anomaly status for the cyber physical system; a threat detection computer platform to: receive the monitoring node signal values, generate feature vectors from the values; compare the feature vectors with at least one decision boundary associated with each of a local abnormal detection model and a global abnormal detection model; and transmit an abnormal alert signal from the local status determination module and the global status determination module based on a result of each comparison. Numerous other aspects are provided.

17 Claims, 19 Drawing Sheets

(56) References Cited

U.S. PATENT DOCUMENTS

| | | | | |
|---|---|---|---|---|
| 9,203,859 | B2 | 12/2015 | Sampigethaya | |
| 9,317,983 | B2* | 4/2016 | Ricci | H04W 12/06 |
| 9,430,616 | B2* | 8/2016 | Duftler | G06F 16/282 |
| 9,430,646 | B1* | 8/2016 | Mushtaq | H04L 67/02 |
| 9,628,365 | B2* | 4/2017 | Gelvin | G06F 15/173 |
| 10,317,415 | B2 | 6/2019 | Gu et al. | |
| 10,826,932 | B2* | 11/2020 | Abbaszadeh | G06N 5/04 |
| 11,824,646 | B1* | 11/2023 | Muddu | H04L 41/22 |
| 2007/0028220 | A1* | 2/2007 | Miller | G06F 18/2137 |
| | | | | 717/124 |
| 2017/0063889 | A1* | 3/2017 | Muddu | H04L 63/20 |
| 2017/0323274 | A1* | 11/2017 | Johnson | G05B 13/041 |
| 2018/0157838 | A1* | 6/2018 | Bushey | H04L 63/1483 |
| 2020/0089874 | A1* | 3/2020 | Abbaszadeh | H04L 63/1425 |
| 2020/0106785 | A1 | 4/2020 | Abbaszadeh et al. | |
| 2020/0233956 | A1* | 7/2020 | Wang | B60L 53/305 |
| 2021/0209233 | A1* | 7/2021 | Rieger | H04L 63/1433 |
| 2022/0253531 | A1* | 8/2022 | Kim | G06F 11/323 |

OTHER PUBLICATIONS

Zhang, Dan et al., "Physical Safety and Cyber Security Analysis of Multi-Agent Systems: A Survey of Recent Advances", IEEE/CAA Journal of Automatica Sinica, vol. 8, No. 2, Feb. 2021, DOI: 10.1109/JAS.2021.1003820, (pp. 319-333, 15 total pages).
Communication: "Extended European Search Report", dated Aug. 17, 2022 (Aug. 17, 2022), European Patent Office, for European Application No. 22167814.7-1218, 9pgs.

* cited by examiner

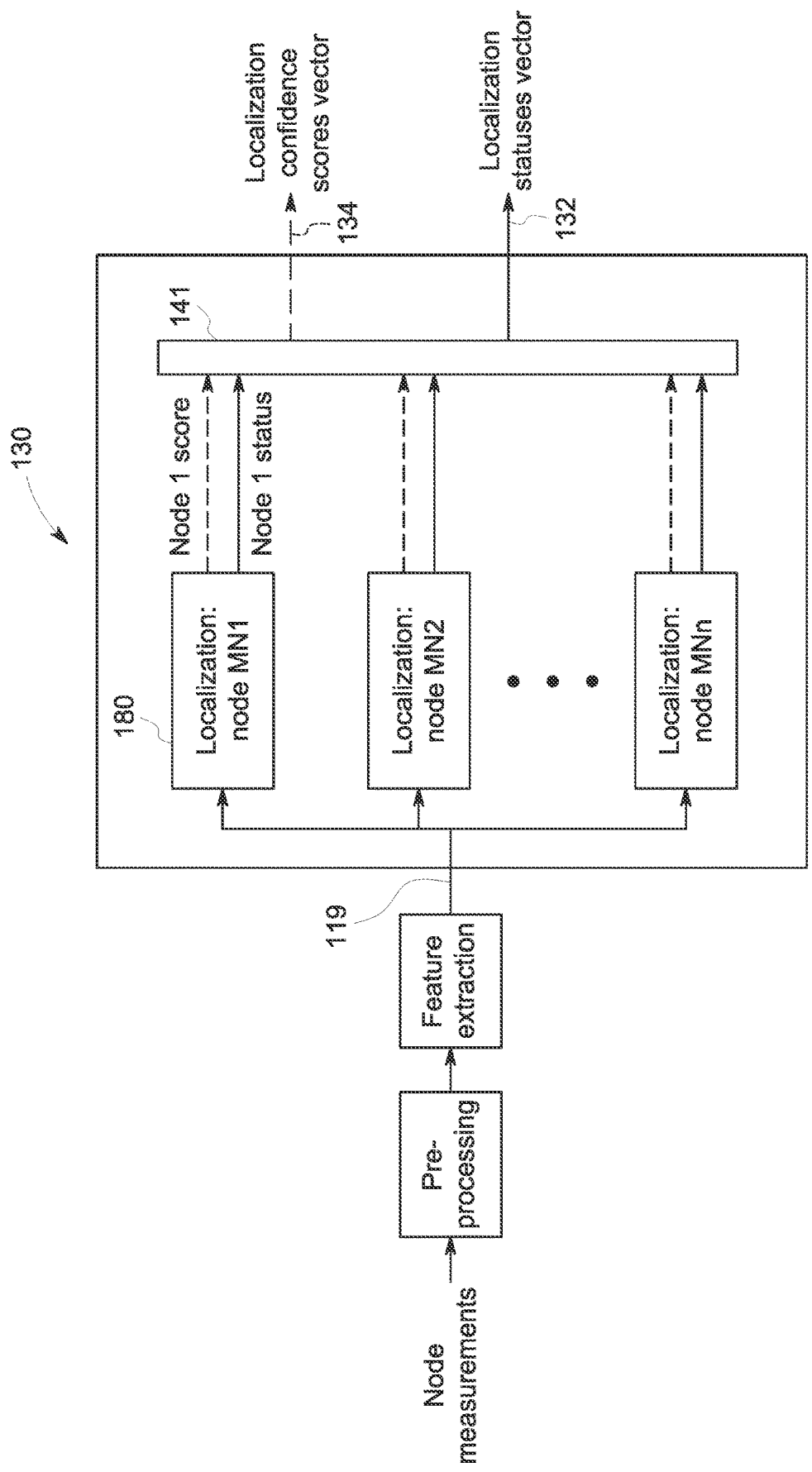

UNIFIED MULTI-AGENT SYSTEM FOR ABNORMALITY DETECTION AND ISOLATION

This invention was made with Government support under contract number DE-0E0000903 awarded by the Department of Energy. The Government has certain right in this invention.

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.) that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain." Such attacks can diminish the performance of a control system and may cause total shut down or even catastrophic damage to a plant. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). It may also be important to determine when a monitoring node is experiencing a fault (as opposed to a malicious attack) and, in some cases, exactly what type of fault is occurring. Existing approaches to protect an industrial control system, such as failure and diagnostics technologies, may not adequately address these problems— especially when multiple, simultaneous attacks and/faults occur since such multiple faults/failure diagnostic technologies are not designed for detecting stealthy attacks in an automatic manner.

Additionally, existing approaches may use a single classifier model to determine that an anomaly exists. However, a single classifier model cannot meet the requirements for rapid and accurate abnormality detection and localization in complex dynamic environments. It would therefore be desirable to protect a cyber-physical system from cyber-attacks in an automatic and accurate manner even for a complex dynamic environment.

SUMMARY

According to some embodiments, a system is provided including a plurality of real-time monitoring nodes to receive streams of monitoring node signal values over time that represent a current operation of the cyber physical system; a local status determination module comprising an ensemble of local agents, the module adapted to determine an anomaly status for one or more nodes; a global status determination module comprising an ensemble of global agents, the module adapted to determine an anomaly status for the cyber physical system; a threat detection computer platform comprising a memory and a computer processor, the threat detection computer platform coupled to the plurality of real-time monitoring nodes and adapted to: receive the monitoring node signal values, generate feature vectors from the received monitoring node signal values; compare via the local status determination module the feature vectors with at least one decision boundary associated with a local abnormal detection model; compare via the global status determination module the feature vectors with at least one decision boundary associated with a global abnormal detection model; and transmit an abnormal alert signal from the local status determination module and the global status determination module based on a result of each comparison.

According to some embodiments, a method is provided including providing a local status determination module comprising an ensemble of local agents; providing a global status determination module comprising an ensemble of global agents; receiving a stream of monitoring node signal values from a plurality of real-time monitoring nodes, wherein the monitoring node signal value represent a current operation of the cyber physical system; generating feature vectors from the received monitored node signal values; determining, via the local status determination module, an anomaly status for one or more nodes by comparing the feature vectors with at least one decision boundary associated with a first abnormal detection model; determining, via the global status determination module, an anomaly status for the cyber physical system by comparing the feature vectors with at least one decision boundary associated with a second abnormal detection model; transmitting a first abnormal alert signal and a second abnormal alert signal based on a result of the comparison by the local status determination module and the comparison by the global status determination module.

According to some embodiments, a non-transitory computer readable medium storing program code is provided, the program code executable by a computer processor to cause the processor to perform a method to protect a cyber physical system associated with a plurality of monitoring nodes, each generating a series of current monitoring node values over time that represent a current operation of the cyber physical system, the method including: generating feature vectors from the received monitored node signal values; determining, via a local status determination module comprising an ensemble of local agents, an anomaly status for one or more nodes by comparing the feature vectors with at least one decision boundary associated with a first abnormal detection model; determining, via a global status determination module comprising an ensemble of global agents, an anomaly status for the cyber physical system by comparing the feature vectors with at least one decision boundary associated with a second abnormal detection model; transmitting a first abnormal alert signal and a second abnormal alert signal based on a result of the comparison by the local status determination module and the comparison by the global status determination module.

Some technical advantages of some embodiments disclosed herein are improved systems and methods to protect one or more cyber-physical systems from abnormalities, such as cyber-attacks, in an automatic and accurate manner.

With this and other advantages and features that will become hereinafter apparent, a more complete understanding of the nature of the invention can be obtained by referring to the following detailed description and to the drawings appended hereto.

Other embodiments are associated with systems and/or non-transitory computer-readable mediums storing instructions to perform any of the methods described herein.

BRIEF DESCRIPTION OF THE DRAWINGS

FIG. 1C is a high-level architecture of the local status determination module shown in FIG. 1A in accordance with some embodiments.

DETAILED DESCRIPTION

Figure 1A:
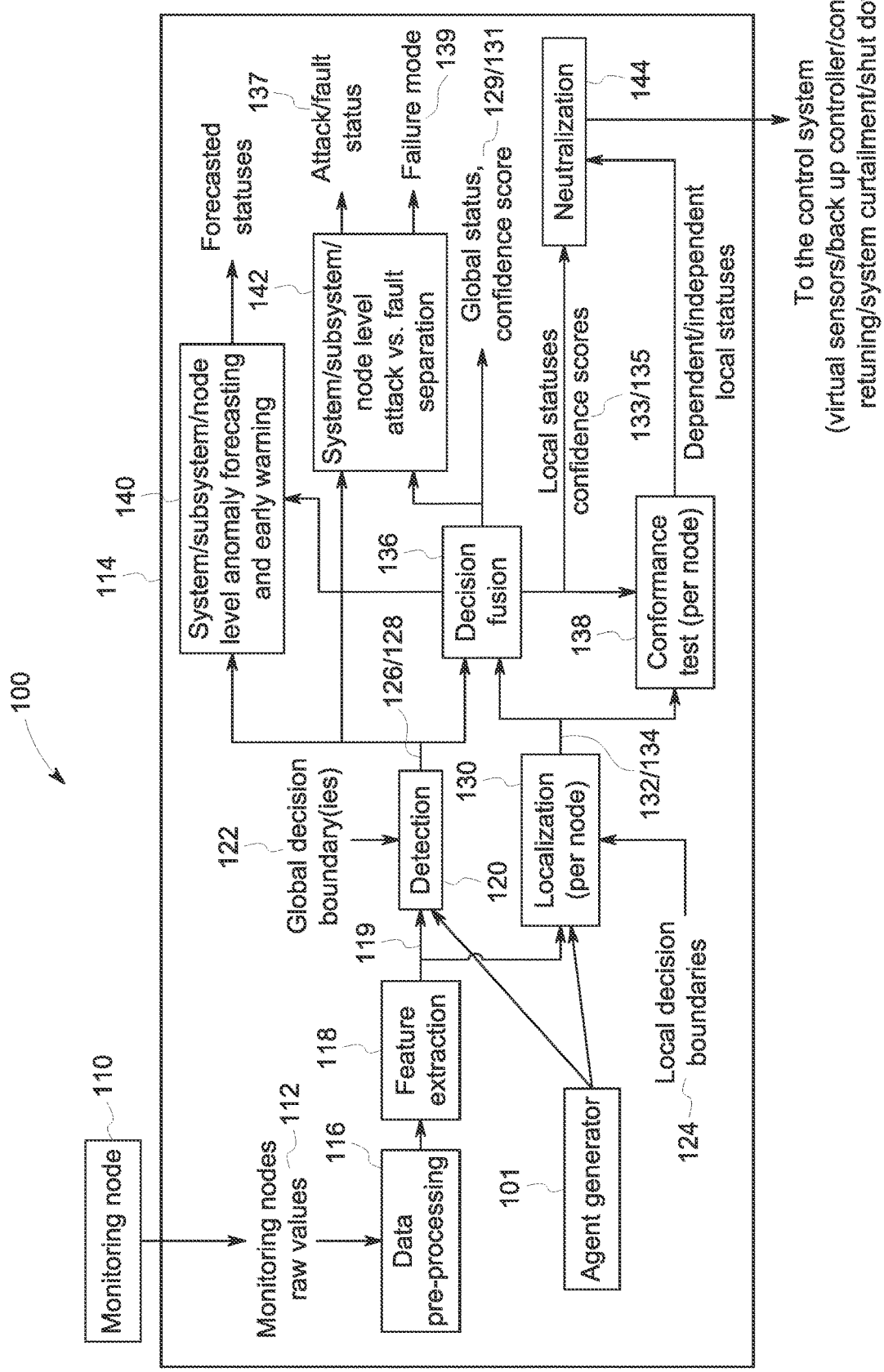
FIG. 1A is a high-level block diagram of a system that may be provided in accordance with some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments provide a unified architecture for multi-method multiple model and ensemble approaches for detection and localization/isolation via multi-ensemble decision boundaries and decision fusion mechanisms. As used herein, "detection" may refer to a global anomalous detection for a whole system/industrial asset ("Cyber Physical System"—CPS), while "localization" may refer to local anomalous detection for individual nodes, e.g., sensors, actuators, controller parameters/gains, components, or subsystems. In one or more embodiments a threat detection computer platform may receive time-series measurements from a plurality of the system monitoring nodes (sensors/actuators, control parameters, components, or subsystems). These measurements may more specifically be received by a global determination module and a local determination module. Each of the global determination module and the local determination module may include a plurality of agents (ensemble detectors). The ensemble model may capture the overall behavior of the asset better than any single agent model, specially in the presence of nonlinear or time-varying dynamics. Each of the detectors may execute a different available model based, for example, on different applications. Each of these models may be trained by a different process. For example, in the case of a jet engine, the engine may have different modes of operation—takeoff, cruise and landing. The behavior of the engine during each of these modes may be very different. As such, embodiments provide an agent with a model trained with a given process for the takeoff mode, a model trained with a given process (same or different process than for takeoff) for the cruise mode and a model trained with a given process (same or different process than for either takeoff or cruise) for the landing process.

While a single agent may be used to detect anomalies during each of these modes, for example, it may be better to provide a detector/agent for each individual mode. The reason for this may be that different degrees of data (amount and/or accuracy of data) may be available for each mode, and when a single agent is used, the agent may have to detect anomalies using a model that operates as if all of the modes use a same degree of data—typically the least amount/accuracy. Using different agents allows the agent to use a model best suited to degree of data for that mode, or best suited to other parameters for that mode.

Continuing with the engine example, perhaps for cruise, only measured normal historical data is available having a false positive rate of 10-20%, while for takeoff and landing both normal historical data as well as simulated data of normal operation and abnormal operation is available having a false positive rate of –0.5-1%. With a single agent, the agent may need to only use normal historical data when detecting anomalies for each of the takeoff, cruise, landing modes of operation.

One or more embodiments, on the other hand, may provide multiple agents, where one agent detects anomalies for the cruise using the normal historical data, while one agent detects anomalies for the takeoff using the normal historical and simulated data, and another agent detects anomalies for the landing using the normal historical and simulated data. A status fusion module may then combine the determined anomaly data from each agent to provide a determined anomaly status for the node or system.

FIG. 1A is a high-level block diagram of a system 100 that may be provided in accordance with some embodiments. The system 100 includes monitoring nodes 110, such as sensors, actuators, controller parameters/gains, a component, a subsystem, etc. that generate a series of current monitoring node values 112 over time that represent a current operation of a cyber-physical system (e.g., an industrial asset). The monitoring node raw values 112 may be received by a threat detection computer platform 114, and in particular a data pre-processing element 116 on the platform 114. The pre-processing module 116 may filter and/or smooth noisy data (e.g., to address gaps in the data, bad data, outliers, etc.). Next the pre-processed ("clean") data may be received by a feature extraction module 118. The feature extraction module 118 may generate a feature vector 119 for the current monitoring node using the current monitoring node signal values 112. Note that generation of the feature vector may include processing via one of feature transforms, identity transforms, and feature-based dynamic models. According to some embodiments, at least one of the current monitoring node feature vectors is associated with principal components, statistical features, deep learning features, frequency domain features, time series analysis features, logical features, geographic or position-based locations, and/or interaction features.

The feature vector 119 may be received by a global status determination module 120 and a local status determination module 130. As described with respect to FIGS. 3 through 14, the global status determination module 120 ("detection") and local status determination module 130 ("localization") may generate "abnormality" decisions based on feature vectors and global decision boundary(ies) 122 and local decision boundaries 124. In particular, the global status determination module 120 may generate a global anomaly status 126 indicating if the cyber-physical system is experiencing "normal" or "abnormal" operation. According to some embodiments, the global status determination module 120 may further generate a global confidence score 128 that represents how confident the module is about the anomaly status (risk of anomaly) (e.g., with higher values of the score indicating a greater likelihood of abnormality). The local determination module 130 may generate, for each monitoring node, a local anomaly status 132 indicating if that monitoring node is experiencing "normal" or "abnormal" operation. The local status determination module 130 may generate a local confidence score 134 that represents how confident the module is about the anomaly status (risk of anomaly) for each monitoring node (e.g., with higher values of the score indicating a greater likelihood of abnormality).

Note that both determination modules 120, 130 may generate a relatively small number of "false positive" decisions (indicating abnormal operation when in fact normal operation is being experienced) and "false negative" decisions (indicating normal operation when in fact abnormal operation is occurring). As a result, the global and local statuses could provide contradictory information. For example, the global status might indicate "normal" operation even when one or more local statuses indicate "abnormal operation." To address these situations, a decision fusion computer platform 136 receives the global status 126 and the local status 132 (which may itself be a combination of the status of multiple nodes), as well as the global score 128 and local score 134 and generates a "fused" global status 129 and, for each monitoring node, a "fused" local status 133, in addition to a fused confidence score for the status 131/133, respectively. It is noted that the global score 128 maybe a single number, while the local score 134 may be a vector (multiple numbers) the same size as the local status 132. These statuses are "fused" in the sense that information is merged, and contradictory situations may be avoided.

The system 100 may also include a conformance test module 138. The conformance test module 138 may receive the local anomaly status 132 and local confidence score 134 (per node) and may determine (on a node-by-node basis) whether an abnormal local status is "independent" or "dependent" (likely caused by an abnormality existing at another monitoring node) based on a casual dependency matrix, propagation paths, control loops time constraints, etc., as described below with respect to FIG. 17. The conformance test module 138 may also receive the output from the decision fusion module 136 and use this data in the conformance determination (independent or dependent).

The system 100 may also include a system/subsystem/node level anomaly forecasting and early warning system 140, which may receive the global anomaly status 126, the global confidence score 128 from the global status determination module 120, and output from the decision fusion computer 136 as input, and, in turn, output a forecasted status for early warning generation. The early warning may be communicated to the operator as an indication of emerging abnormalities (cyber-threats, faults) for situational awareness, or may be used for early engagement of mitigation or neutralization strategies.

A system/subsystem/node level attack vs. fault separation module 142 may also receive the global anomaly status 126 and the global confidence score 128 from the global status determination module 120, and output from the decision fusion computer 136 as input, and, in turn, outputs an attack/fault status 137 and/or a failure mode 139, as described further below.

The output (local status/confidence score) from the decision fusion computer 136 and the output (dependent/independent local statuses) of the conformance test module 138 may be received by a neutralization module 144. The neutralization module 144 may try to cancel the effect of the anomaly by calculating normal values for the affected nodes using values from nodes that have a normal anomaly status. These calculated normal values may be sent to a control system (virtual sensors/back up controller, controller) to neutralize (return/system curtailment, shut down, etc.) the abnormality.

Figure 1B:
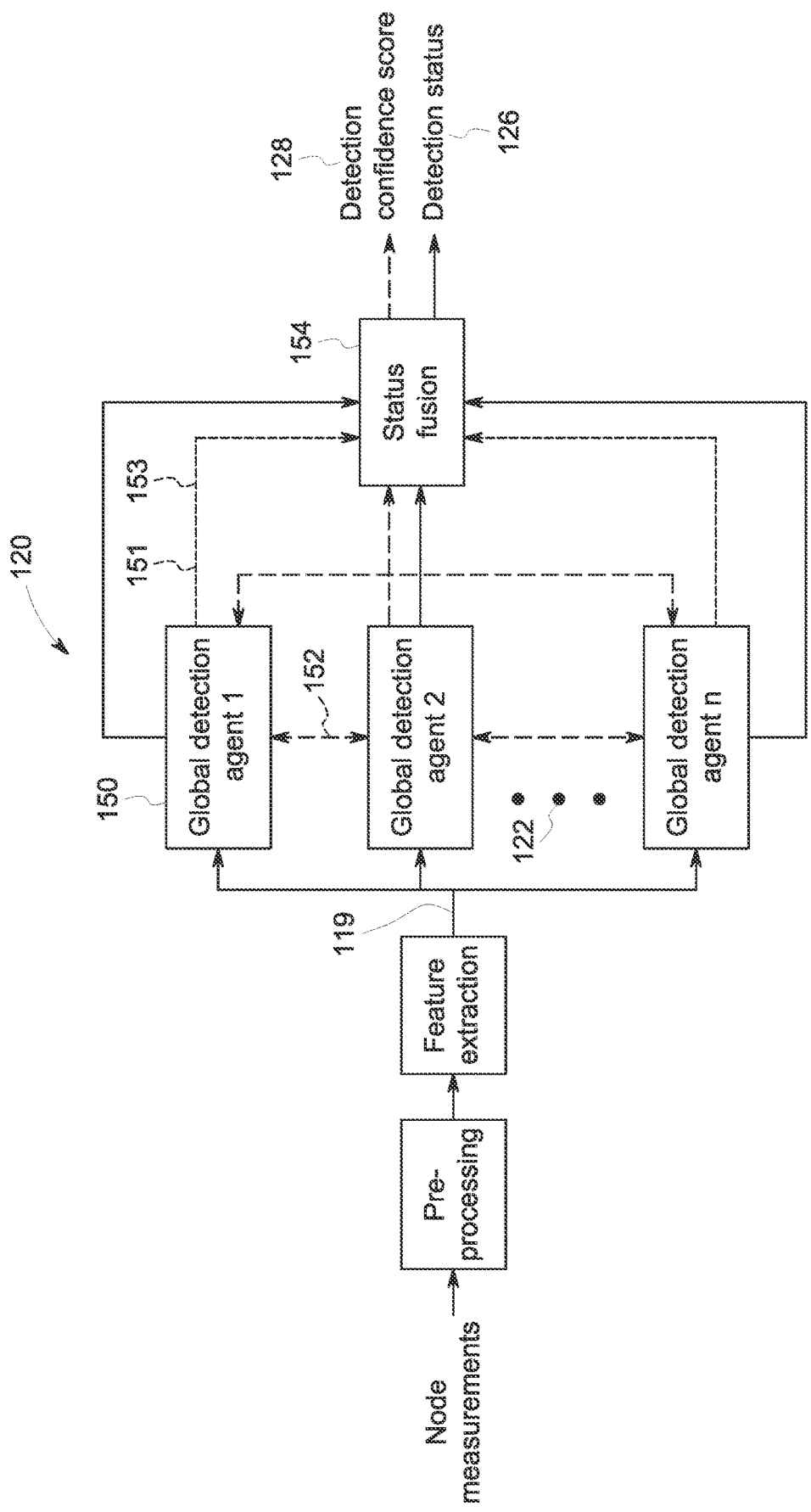
FIG. 1B is a high-level architecture of the global status determination module shown in FIG. 1A in accordance with some embodiments.

FIG. 1B is a high-level architecture of the global status determination module 120 shown in FIG. 1A. The global status determination module 120 may include a plurality of agents (an ensemble) 150, each responsible for monitoring a portion of the system. The detection agent 150 may be a model that receives the feature vectors 119 as input, and outputs an agent anomaly status 151. Each agent 150 may receive its own set of features, and may use different sets of monitoring nodes to procure data values. As will be described further below with respect to FIG. 1D, each model/agent 150 may be developed using any of the three methods (162, 164, 166), such that the determination module 120 may include agents developed using different methods from each other. Each agent 150 may be trained with data representing a different mode of operation of the CPS, and may run in parallel. As indicated by the dashed lines 152, the different agents 150 may share data (e.g., anomaly score, features, etc.) with each other and may use this shared data in generating the anomaly status for that agent. This shared data may create couplings among the agents, which may be leveraged to increase the system accuracy and robustness. The ensemble agents and such couplings may be learned using gradient boosting or ensemble (machine) learning techniques including, but not limited to bootstrap aggregation, Bayesian model combination, Bayesian model averaging, boosting and stacking. The coupling may also be determined in-part using domain-knowledge of the physical behavior of the asset. As described above, each detection agent 150 may output at least two items—the agent anomaly status 151 (normal/abnormal) and an agent confidence score 153 representing the confidence in the status.

The global status determination module 120 includes a status fusion module 154. The status fusion module 154 may combine all the individual detection agent 150 outputs into the final system status (abnormal/normal) 126. The status fusion module 154 may use at least one of several different processes to combine the outputs. As a non-exhaustive example, the fusion may be a rule-based fusion or a machine-learning (ML)-based fusion.

With rule-based fusion, when a confidence score is not available, (e.g., when an agent comprises of a simple model such as a K-NN or a decision tree) the status fusion module 154 may combine the individual detection agent outputs via one of majority voting or dynamic detection selection (pre-stored look-up table). With the majority voting process, the status is selected based on the majority of statutes reported by the agents. It is noted that when the score is not available, majority voting does not use a weighted average. With dynamic detection agent selection, the status fusion module 154 may, for the global status determination module 120, use the nodes and other data, including, but not limited to, mode, ambient condition, etc. to combine the agent outputs to dynamically select the dominant agent in each time instant. The criteria for dynamic detection agent selection are determined using simulation and pre-stored in the system. The dynamic detection agent selection may also be combined with the majority voting to, for example, break a tie.

In a case a confidence score is available, the status fusion module 154 may combine the agent outputs by taking a weighted average of the normalized confidence (e.g., risk or probability of anomaly) scores. Each detection agent may have its own set threshold to be compared with its own confidence score to report its own status. In order for the confidence scores from different agents in the ensemble to be comparable to each other, each score is normalized as "distance to its own threshold":

$$\text{score\_normalized}_i = (\text{score}_i - THR_i)/THR_i$$

where $\text{score}_i$ and $THR_i$ are the confidence score and the threshold of the i-th agent, respectively.

The weights in the weighted average may be obtained from training confusion matrices or from the real-time confidence numbers. The sign of this weighted average determines the overall fused status (negative being "normal" and positive being "abnormal"), and the value of the weighted average represents the overall fused confidence score.

With ML-based fusion, the status fusion module 154 may be a classification or regression model trained using any appropriate machine learning technique using a training labeled dataset, including but not limited to linear regression, polynomial models, generalized linear model, extreme learning machine (ELM) regression and deep neural networks. The status fusion module 154 may combine the agent outputs based on this trained model.

FIG. 1C is a high-level architecture of the local status determination module 130 shown in FIG. 1A for multiple localization decisions (e.g., multiple nodes). The module 130 may include as many nodes as desired localizations. Each node may have its own localization, and the localizations of the multiple nodes run in parallel. The score and status from each localization (for each node) may be stacked up in a stack 141 to form the two vectors: localization confidence scores vector 134 and localization statuses vector 132.

Figure 1D:
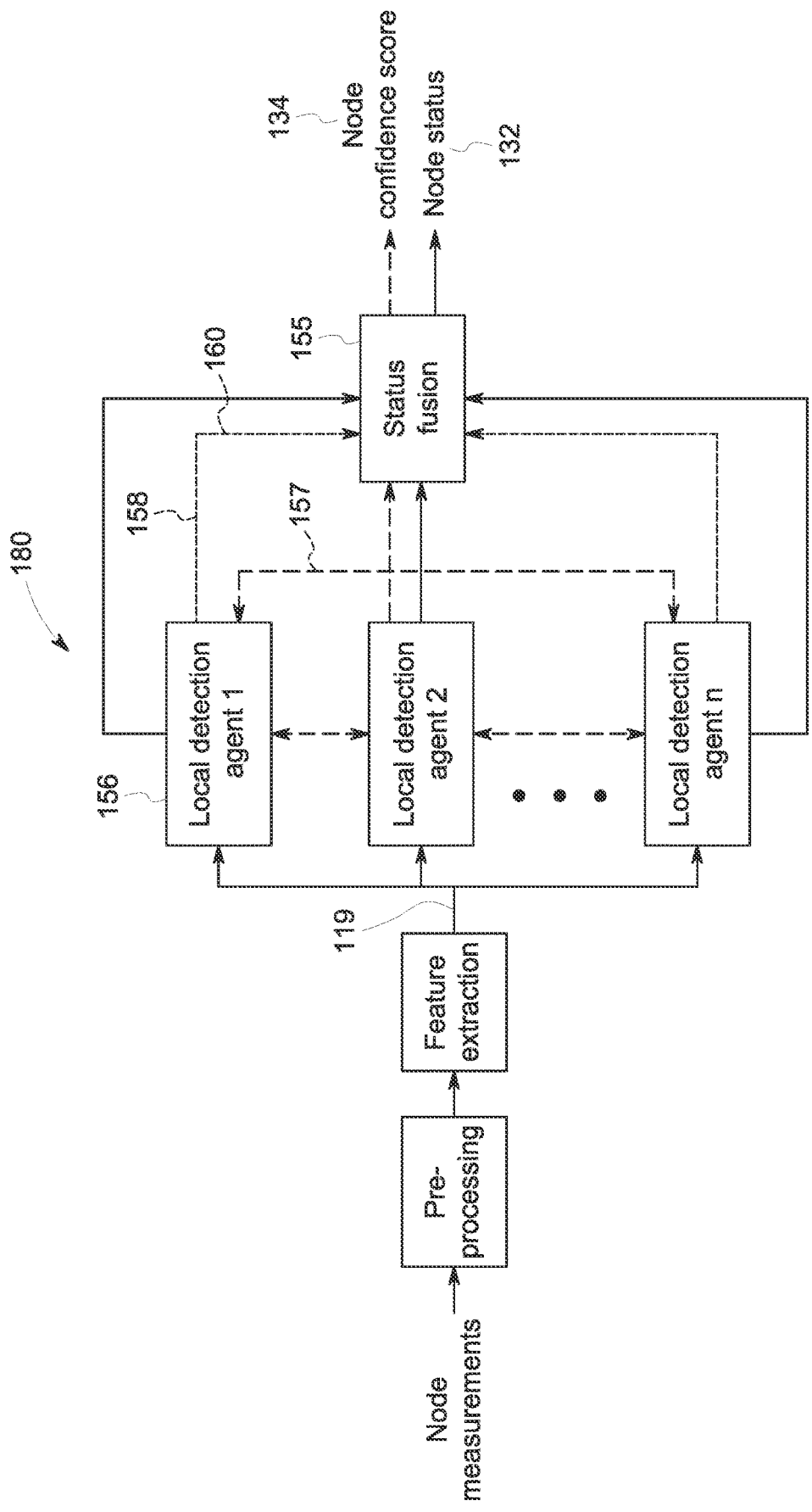
FIG. 1D is a high-level architecture of a single node of the local status determination module shown in FIG. 1C in accordance with some embodiments.

FIG. 1D is high-level architecture for one of the localization decisions (e.g., one node/component/subsystem) 180 of the plurality of decisions/nodes of FIG. 1C. The module 130, may comprise of multiple such ensemble architectures shown in FIG. 1D per each node, as shown in FIG. 1C. The local status determination module 130 may include a plurality of agents (an ensemble) 156, each responsible for a specific mode or region of operation. The node may represent a sensor, an actuator or a controller gain/parameter, a component or a subsystem. The granularity of localization is determined by the asset physical and operation layout and architecture, as well as system requirements. The localization agent 156 may be a model that receives the feature vectors 119 as input, and outputs an agent anomaly status 158. Each agent 156 may receive its own set of features. As will be described further below with respect to FIG. 1E, each model/agent 156 may be developed using any of the three methods (162, 164, 166), such that the determination module 130 may include agents developed using different methods from each other. Each agent 156 may be trained with data representing a different mode of operation of the CPS, and may run in parallel. As indicated by the dashed lines 157, the different agents 156 may share data (e.g., anomaly score, features, etc.) with each other and may use this shared data in generating the anomaly status for that agent. This shared data may create couplings among the agents, which may be leveraged to increase the system accuracy and robustness. Such couplings may be learned using gradient boosting or ensemble (machine) learning techniques including, but not limited to Bayesian model combination, Bayesian model averaging, boosting and stacking. The coupling may also be determined in-part using domain-knowledge of the physical behavior of the asset. As described above, each detection agent 156 may output at least two items—the agent anomaly status 158 (normal/abnormal) and an agent confidence score 160 representing the confidence in the status.

Like the global status determination module 120, the local status determination module 130 includes the status fusion module 155. The status fusion module 154 may combine all the individual detection agent 156 outputs into the final node status (abnormal/normal) 133. The status fusion module 155 may use at least one of several different processes to combine the outputs. As a non-exhaustive example, the fusion may be a rule-based fusion or a machine-learning (ML)-based fusion.

With rule-based fusion, when a confidence score is not available (e.g., when an agent comprises of a simple model such as a K-NN or a decision tree), the status fusion module 154 may combine the individual detection agent outputs via one of majority voting or dynamic detection selection (pre-stored look-up table), as described above.

In a case a confidence score is available, the status fusion module 155 may combine the agent outputs by taking a weighted average of the normalized confidence scores, similar to what was described for global detection. The weights may be obtained from training confusion matrices or from the real-time confidence numbers.

With ML-based fusion, the status fusion module 155 may be a classification or regression model trained using any appropriate machine learning technique using a training labeled dataset, including but not limited to linear regression, polynomial models, generalized linear model, extreme learning machine (ELM) regression and deep neural networks. The status fusion module 154 may combine the agent outputs based on this trained model.

Figure 1E:
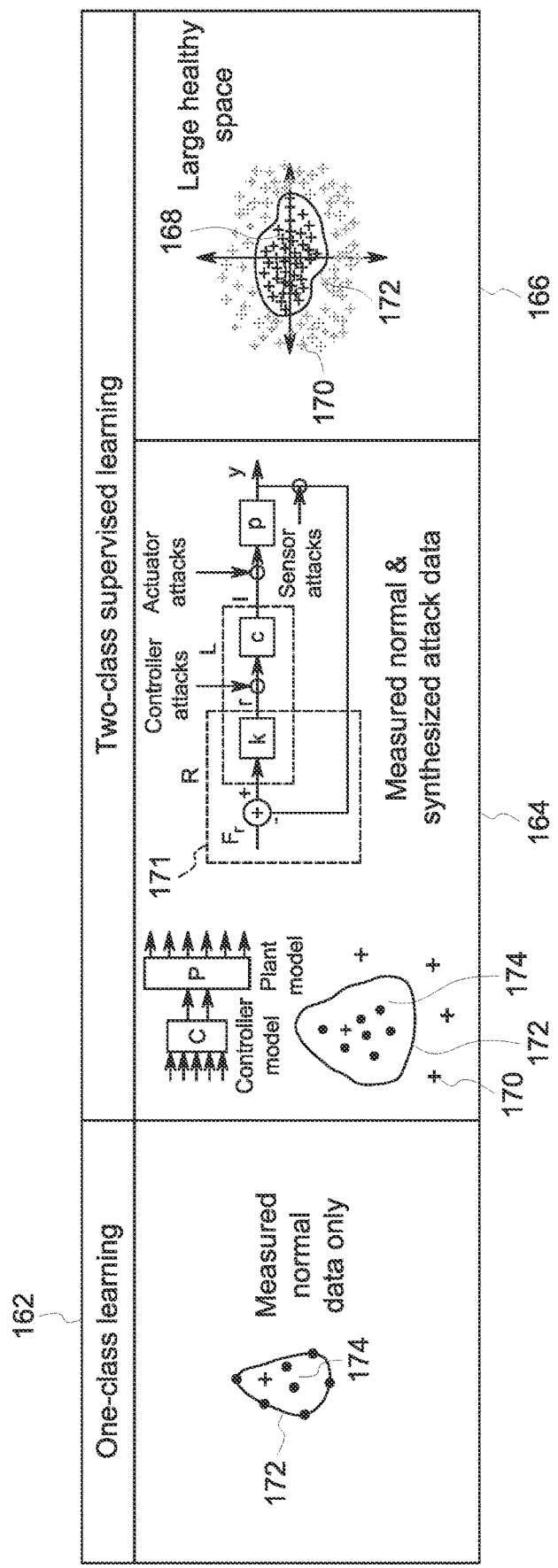
FIG. 1E is a chart of methods for training an agent in accordance with some embodiments.

FIG. 1E is a chart depicting three different methods—physics-based 166, data-driven 164 and one-class 162—for developing each model/agent 150/156, such that the determination module 120/130 may include agents developed using different methods from each other.

The physics-based method 166 may be a form of two-class supervised learning that uses a physics-based digital twin model which may be used for simulations to generate normal or abnormal training datasets. The normal data from simulation may be combined with normal data from the field to create the normal training dataset 168. The normal training data as well as abnormal synthesized data 170 are used to the train the model to establish a decision boundary 172. As the training uses physics-based models, high quality training dataset may be generated both in terms of granularity and coverage, resulting in a very low false positive rate and high accuracies providing excellent predictability and extrapolation.

The data-driven method 164 may be a form of two-class supervised learning that uses a data-driven digital twin model 171 developed using historical field data via dynamic system modeling methods such as machine learning (e.g., recurrent neural networks) or system identification methods. The data-driven digital twin model may be a complete black box model or a structured grey-box model, e.g., partitioned to represent the control loop structure. Similar to the physics-based digital twin, the data-driven digital twin may be used to simulate the system and generate synthetic abnormal and normal data. The normal data 174 from sensors and actuators (e.g., pressure, flow, speed) and abnormal synthesized data 170 is used to train the detection and location models to establish a decision boundary 172. As the training data is obtained using a data-driven digital twin, which may have a lower fidelity than a physic-based model there may be less predictability and extrapolation than with the physics-based method 166. Although, the fidelity of the data-driven digital twin may be increased by increasing the amount and the coverage of the historical field data, and may approach the fidelity of the physics-based model, it is generally expected that a data-driven digital twin has lower fidelity than a physics-based first-principle digital twin. However, this approach is suitable when a physics-based model is not available for the system or a node of the system, and it is expensive and complicated to develop. Note that in any of these approaches, the digital twin (either physics-based or data-driven) is not used as a anomaly detection or localization model, but it is used to generate simulation training data to train those models.

The one-class method 162 may be a form of one-class learning that uses only measured normal historical field data 174 to establish a decision boundary 172. As the one-class method 162 does not use any abnormal data, no asset model or heavy simulations are required to generate training data. This will make the development and deploy process quick and lowers the cost. The performance of detection and location models developed using this approach depends on the quality and availability of the historical field data and the application domain. This approach may be useful when the system or part of the system (e.g. a node) does not have a physic-based model available and is still too complex for developing a well-representative data-driven digital twin.

Each model/agent 150/156 may be trained prior to execution of the system by a method as selected by a designer/development team. The method may be selected based on data availability, as well as other considerations including but not limited to accuracy/complexity/cost. Aside from this, since each method uses a different perspective and different training datasets, and ensemble of agents developed using different methods, may outperform any single agent.

Figure 2:
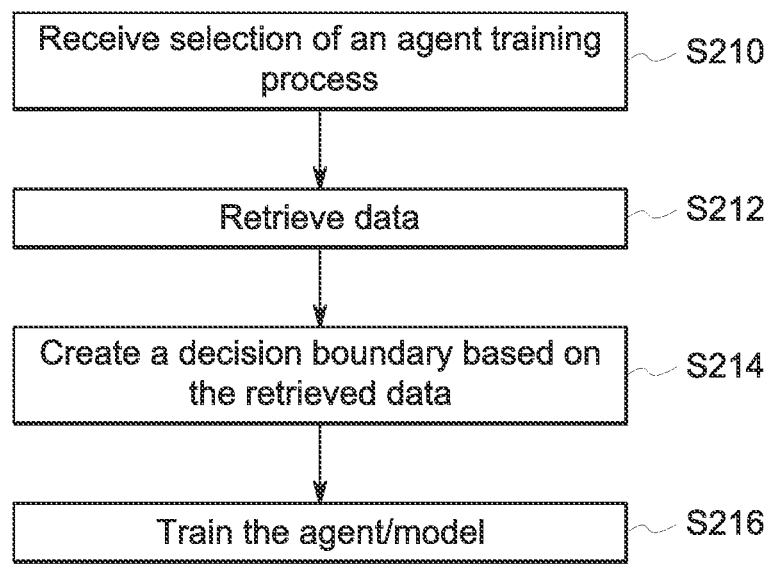
FIG. 2 is a method that may be provided in accordance with some embodiments.

For example, FIG. 2 is a method that may be provided in accordance with some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, an agent generator 101 receives selection of a process to train an agent 150/156. The selection may be from a developer via selection of a selector on a user interface. The process may be one of the physics-based 166, data-driven 164 and one-class 162 processes. Then, in S212, the agent generator 101 retrieves data for training the agent/model. As described above, when the physics-based 166 process is selected, the agent generator may retrieve normal data from simulation and in the field as well as abnormal synthesized data of a physics-based digital twin, the data stored in/and retrieved from any suitable data store to train the agent/model. In a case the data-driven method 164 is selected, the agent generator 101 may retrieve measured normal data (sensor and actuator data (e.g., pressure, flow, speed)) and abnormal synthesized data from any suitable data store to train the model/agent. In a case the one-class method is selected, the agent generator 101 may retrieve measured normal data from any suitable data store to train the agent/model. Next, in S214, a decision boundary is created based on the retrieved data, as described further below with respect to FIG. 4. The agent/model is then trained in S216 using the retrieved data and the established decision boundary.

Figure 3:
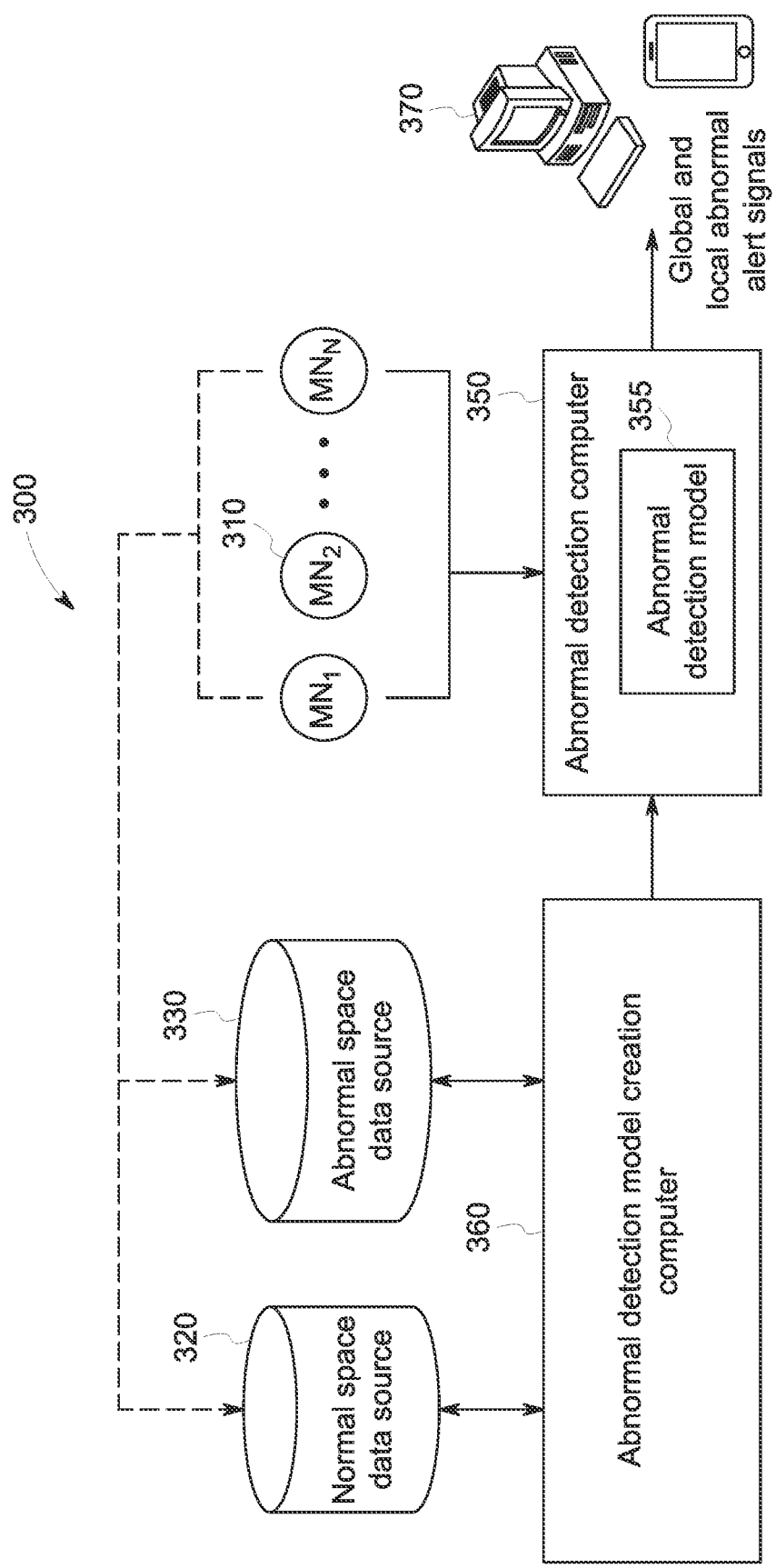
FIG. 3 is a high-level block diagram of a system that may be provided in accordance with some embodiments.

FIG. 3 is a high-level architecture of a system 300 in accordance with some embodiments. The system 300 may include monitoring node sensors 310 $MN_1$ through $MN_N$, a "normal space" data source 320, and an "abnormal space" data source 330. The normal space data source 320 might store, for each of the plurality of monitoring nodes 310, a series of normal values over time that represent normal operation of a cyber-physical system (e.g., generated by a model or collected from actual sensor data as illustrated by the dashed line in FIG. 3). The abnormal space data source 330 might store, for each of the monitoring nodes 310, a series of abnormal values that represent abnormal operation of the cyber-physical system (e.g., when the system is experiencing a cyber-attack or a fault).

Information from the normal space data source 320 and the abnormal space data source 330 may be provided to an abnormal detection model creation computer 360 that uses this data to create a decision boundary (that is, a boundary that separates normal behavior from threatened behavior). The decision boundary may then be used by an abnormal detection computer 350 executing an abnormal detection model 355. The abnormal detection model 355 may, for example, monitor streams of data from the monitoring nodes 310 comprising data from sensor nodes, actuator nodes, and/or any other critical monitoring nodes (e.g., sensor nodes $MN_1$ through $MN_N$) and automatically output global and local abnormal alert signal to one or more remote monitoring devices 370 when appropriate (e.g., for display to an operator or to have the global and local information fused in accordance with any of the embodiments described herein). As used herein, the term "automatically" may refer to, for example, actions that can be performed with little or no human intervention. According to some embodiments, information about detected threats may be transmitted back to a cyber-physical system control system.

As used herein, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The abnormal detection model creation computer 360 may store information into and/or retrieve information from various data stores, such as the normal space data source 320 and/or the abnormal space data source 330. The various data sources may be locally stored or reside remote from the abnormal detection model creation computer 360. Although a single abnormal detection model creation computer 360 is shown in FIG. 3, any number of such devices may be included. Moreover, various devices described herein might be combined according to embodiments of the present invention. For example, in some embodiments, the abnormal detection model creation computer 360 and one or more data sources 320, 330 might comprise a single apparatus. The abnormal detection model creation computer 360 functions may be performed by a constellation of networked apparatuses, in a distributed processing or cloud-based architecture.

A user may access the system 300 via one of the monitoring devices 370 (e.g., a Personal Computer ("PC"), tablet, or smartphone) to select a process to train an agent, view information about and/or manage threat information in accordance with any of the embodiments described herein. In some cases, an interactive graphical display interface may let a user define and/or adjust certain parameters (e.g., abnormal detection trigger levels) and/or provide or receive automatically generated recommendations or results from the abnormal detection model creation computer 360 and/or abnormal detection computer 350.

Thus, some embodiments described herein may use time series data from one or more monitoring nodes 310 from a physical (i.e., industrial or enterprise) asset and provide a reliable abnormality detection with low false positive rate. The system may extract features from the time series data for each monitoring node. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. The type and number of features for each monitoring node might be optimized using domain-knowledge and/or a feature discovery process. The features may be, for example, calculated over a sliding window with consecutive samples of specified duration from time series data. The length of the window and the duration of overlap for each batch may be determined from domain knowledge and an inspection of the data or using batch processing. Note that features may be computed at the local level (associated with each monitoring node) and the global level (associated with all the monitoring nodes, i.e., the whole asset). The time-domain values of the nodes or their extracted features may be, according to some embodiments, normalized for better numerical conditioning.

Figure 4:
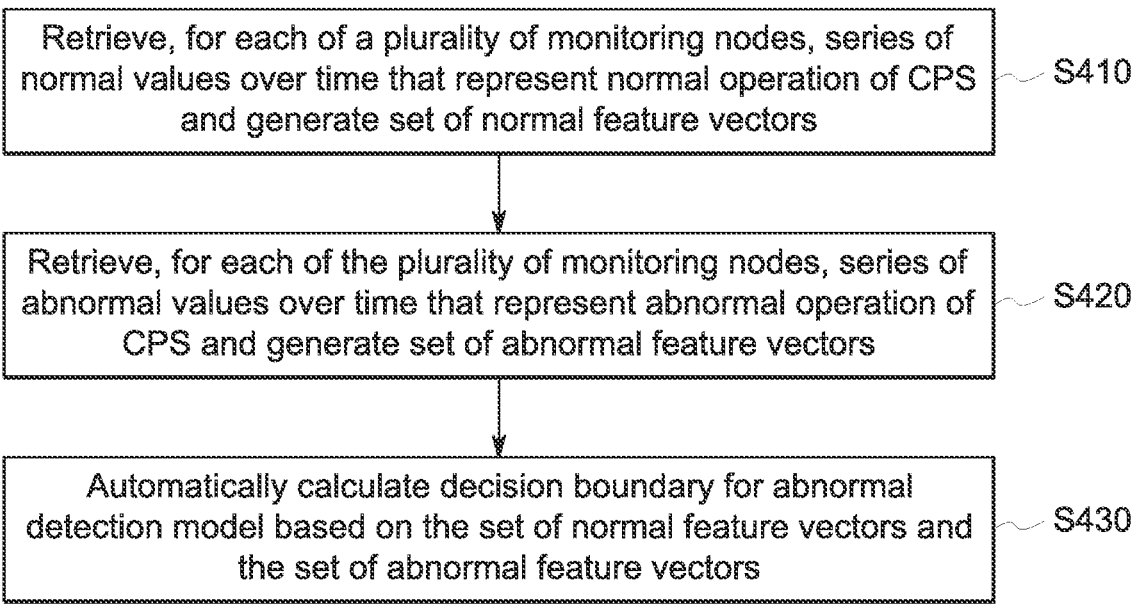
FIG. 4 is a model creation method according to some embodiments.

FIG. 4 illustrates a model creation method that might be performed by some or all of the elements of the system 300 described with respect to FIG. 3. At S410, the system may retrieve, for each of a plurality of monitoring nodes (e.g., sensor nodes, ac, controller nodes, etc.), a series of normal values over time that represent normal operation of the Cyber-Physical System ("CPS") and a set of normal feature vectors may be generated. Similarly, at S420 the system may retrieve, for each of the plurality of monitoring nodes, a series of abnormal (e.g., attacked) values over time that represent an abnormal operation of the cyber-physical system and a set of abnormal feature vectors may be generated. The series of normal and/or abnormal values might be obtained, for example, by running Design of Experiments ("DoE") on a cyber-physical system. At S430, a decision boundary may be automatically calculated for an abnormal detection model based on the set of normal feature vectors and the set of abnormal feature vectors. According to some embodiments, the decision boundary might be associated with a line, a hyperplane, a non-linear boundary separating normal space from threatened space, and/or a plurality of decision boundaries. Moreover, a decision boundary might comprise a multi-class decision boundary separating normal space, attacked space, and degraded operation space (e.g., when a sensor fault occurs). In addition, note that the abnormal detection model might be associated with the decision boundary, feature mapping functions, and/or feature parameters.

Figure 5:
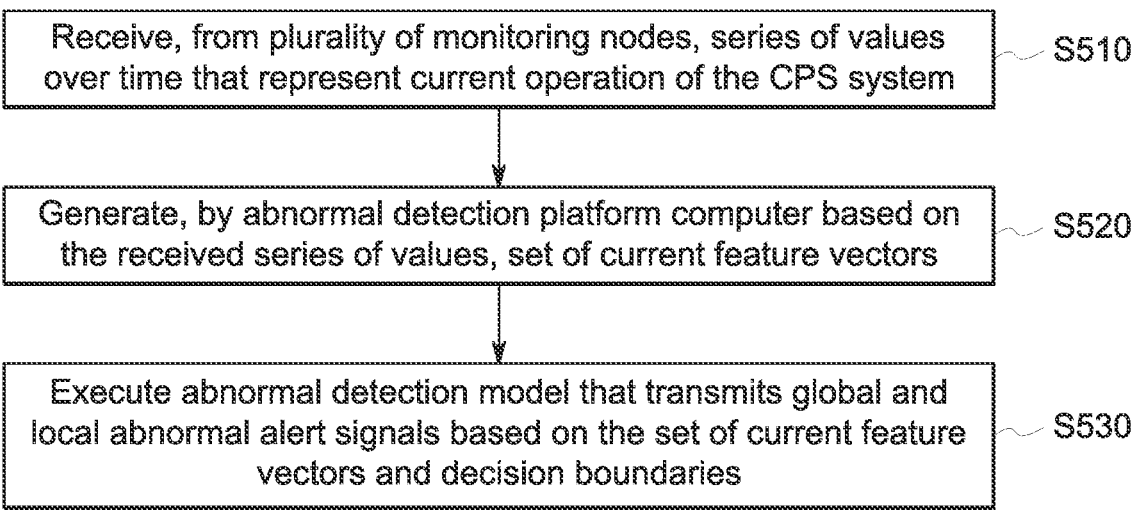
FIG. 5 is an abnormal alert method according to some embodiments.

The decision boundary can then be used to detect abnormal operation (e.g., as might occur during cyber-attacks). For example, FIG. 5 is an abnormal alert method according to some embodiments. At S510, the system may receive, from a plurality of monitoring nodes, a series of current values over time that represent a current operation of the cyber-physical system. At S520, an attack detection platform computer may then generate, based on the received series of current values, a set of current feature vectors. At S530, an abnormal detection model may be executed to transmit an abnormal alert signal based on the set of current feature vectors and a decision boundary when appropriate (e.g., when a cyber-attack is detected). According to some embodiments, one or more response actions may be performed when an abnormal alert signal is transmitted. For example, the system might automatically shut down all or a portion of the cyber-physical system (e.g., to let the detected potential cyber-attack be further investigated). As other examples, one or more parameters might be automatically modified, a software application might be automatically triggered to capture data and/or isolate possible causes, etc.

Some embodiments described herein may take advantage of the physics of a control system by learning a priori from tuned high-fidelity equipment models and/or actual "on the job" data to detect single or multiple simultaneous adversarial threats to the system. Moreover, according to some embodiments, all monitoring node data may be converted to features using advanced feature-based methods, and the real-time operation of the control system may be monitored in substantially real-time. Abnormalities may be detected by classifying the monitored data as being "normal" or disrupted (or degraded). This decision boundary may be constructed using dynamic models and may help enable early detection of vulnerabilities (and potentially avert catastrophic failures) allowing an operator to restore the control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines or machine learning techniques) may be used to generate decision boundaries. Since boundaries may be driven by measured data (or data generated from high-fidelity models), defined boundary margins may help to create an abnormal zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account on operator's knowledge about system operation (e.g., the differences between normal and abnormal operation).

Figure 6:
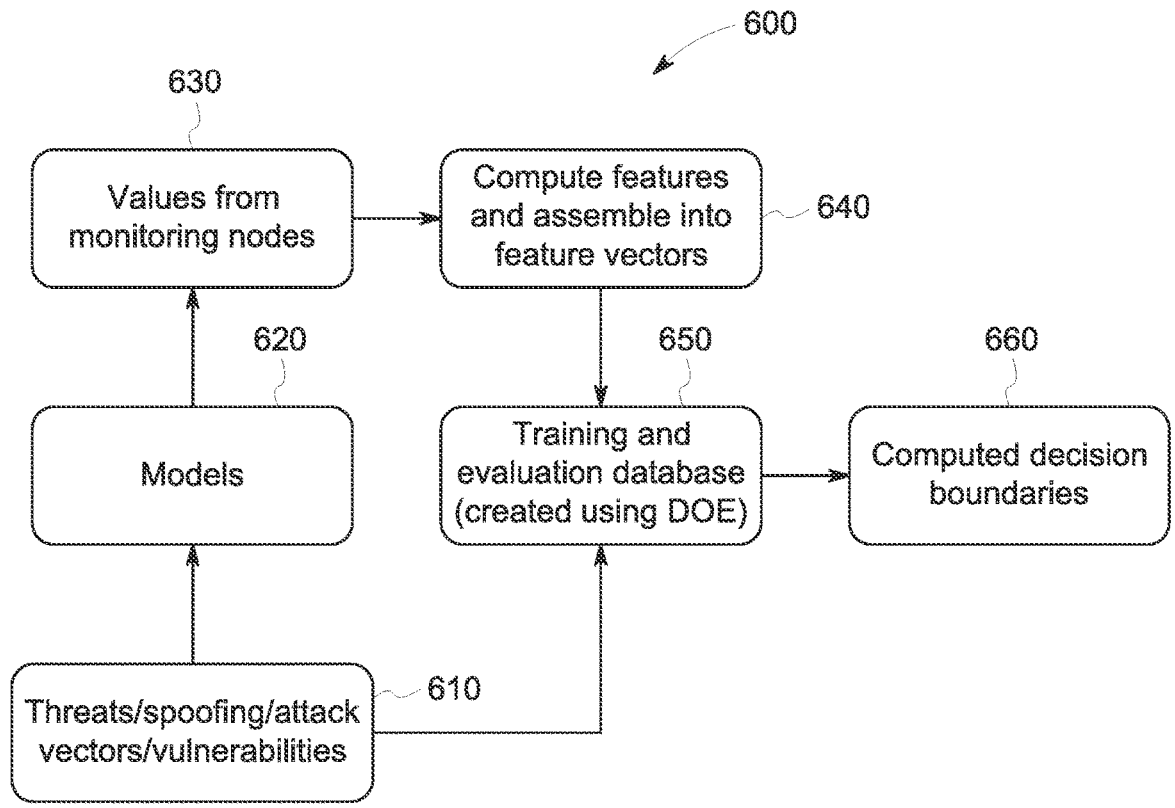
FIG. 6 illustrates an off-line process in accordance with some embodiments.

FIG. 6 illustrates an off-line boundary creation process 600 in accordance with some embodiments. Information about threats, spoofing, attack vectors, vulnerabilities, etc. 610 may be provided to models 620 and/or a training and evaluation database 650 created using DoE techniques. The models 620 may, for example, simulate data 630 from monitoring nodes to be used to compute features that are assembled into a feature vector 640 to be stored in the training and evaluation database 650. The data in the training and evaluation database 650 may then be used to compute decision boundaries 660 to distinguish between normal operation and abnormal operation. According to some embodiments, the process 600 may include a prioritization of monitoring nodes and anticipated attack vectors to form one or more data sets to develop decision boundaries. Attack vectors are abnormal values at critical inputs where malicious attacks can be created at the domain level that will make the system go into threatened/abnormal space. In addition, the models 620 may comprise high-fidelity models that can be used to create a data set (e.g., a set that describes threat space as "levels of threat conditions in the system versus quantities from the monitoring nodes"). The data 630 from the monitoring nodes might be, for example, quantities that are captured for a length of from 60 to 80 seconds from sensor nodes, actuator nodes, and/or controller nodes (and a similar data set may be obtained for "levels of normal operating conditions in the system versus quantities from the monitoring nodes"). This process will result in data sets for "abnormal space" and "normal space." The 60 to 80 seconds long quantities may be used to compute features 640 using feature engineering to create feature vectors. These feature vectors can then be used to obtain a decision boundary that separates the data sets for abnormal space and normal space (used to detect an anomaly such as a cyber-attack).

Since attacks might be multi-prong (e.g., multiple attacks might happen at once), DoE experiments may be designed to capture the attack space (e.g., using full factorial, Taguchi screening, central composite, and/or Box-Behnken). When models are not available, these DoE methods can also be used to collect data from real-world asset control system. Experiments may run, for example, using different combinations of simultaneous attacks. Similar experiments may be run to create a data set for the normal operating space. According to some embodiments, the system may detect "degraded" or faulty operation as opposed to a threat or attack. Such decisions may require the use of a data set for a degraded and/or faulty operating space.

Figure 7:
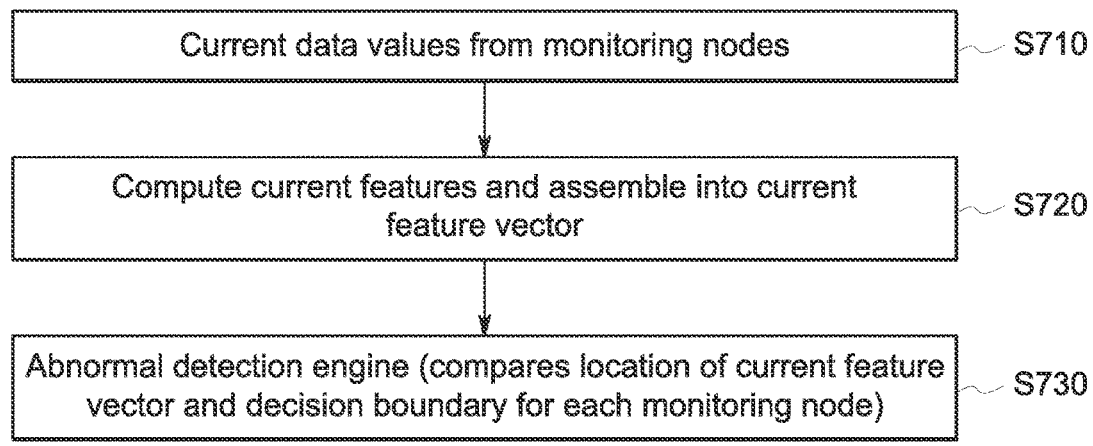
FIG. 7 illustrates a real-time process according to some embodiments.

FIG. 7 illustrates a real-time process to protect a cyber-physical system according to some embodiments. At S710, current data from monitoring nodes may be gathered (e.g., in batches of from 60 to 80 seconds). At S720, the system may compute features and form feature vectors. For example, the system might use weights from a principal component analysis as features. At S730, an abnormal detection engine may compare location of feature vectors to a decision boundary to make a determination (and output an abnormal signal if necessary). According to some embodiments, monitoring node data from models (or from real systems) may be expressed in terms of features since features are a high-level representation of domain knowledge and can be intuitively explained. Moreover, embodiments may handle multiple features represented as vectors and interactions between multiple sensed quantities might be expressed in terms of "interaction features."

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Figure 8:
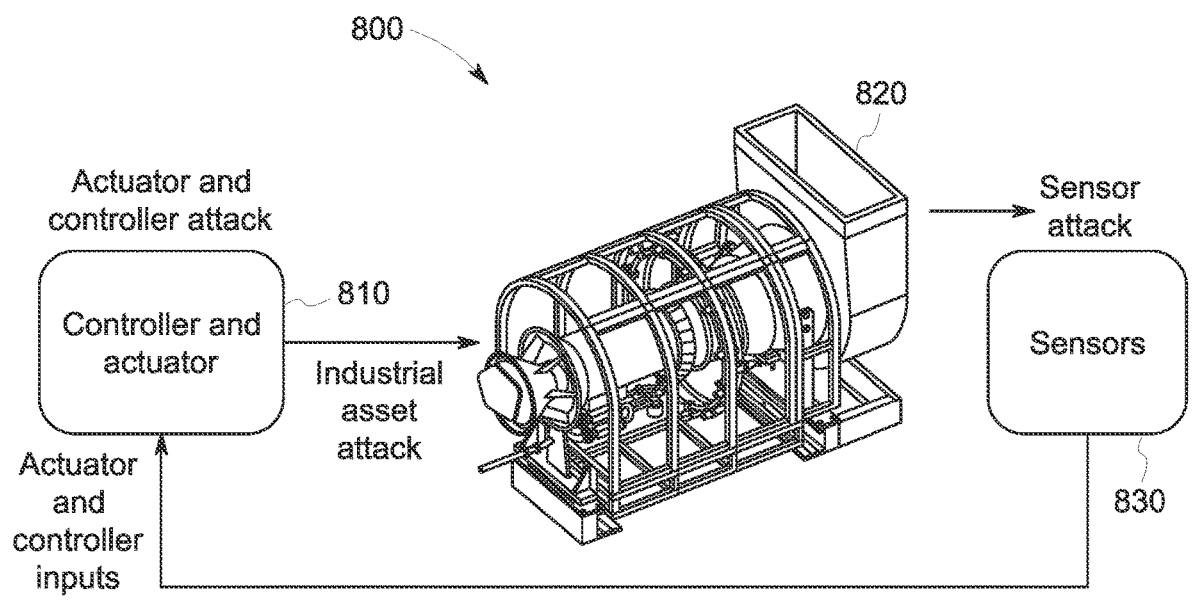
FIG. 8 is an example associated with a cyber-physical system engine in accordance with some embodiments.

FIG. 8 is an example 800 associated with a cyber-physical system in accordance with some embodiments. In particular, the example includes a controller and actuator portion 810 subject to actuator and controller attacks, a gas turbine portion 820 subject to state attacks, and sensors 830 subject to sensor attacks. By way of examples only, the sensors 830 might comprise physical and/or virtual sensors associated with temperatures, airflows, power levels, etc. The actuators might be associated with, for example, motors. By monitoring the information in the cyber-physical system, a threat detection platform may be able to detect cyber-attacks (e.g., using feature vectors and a decision boundary) that could potentially cause a large amount of damage.

Figure 9:
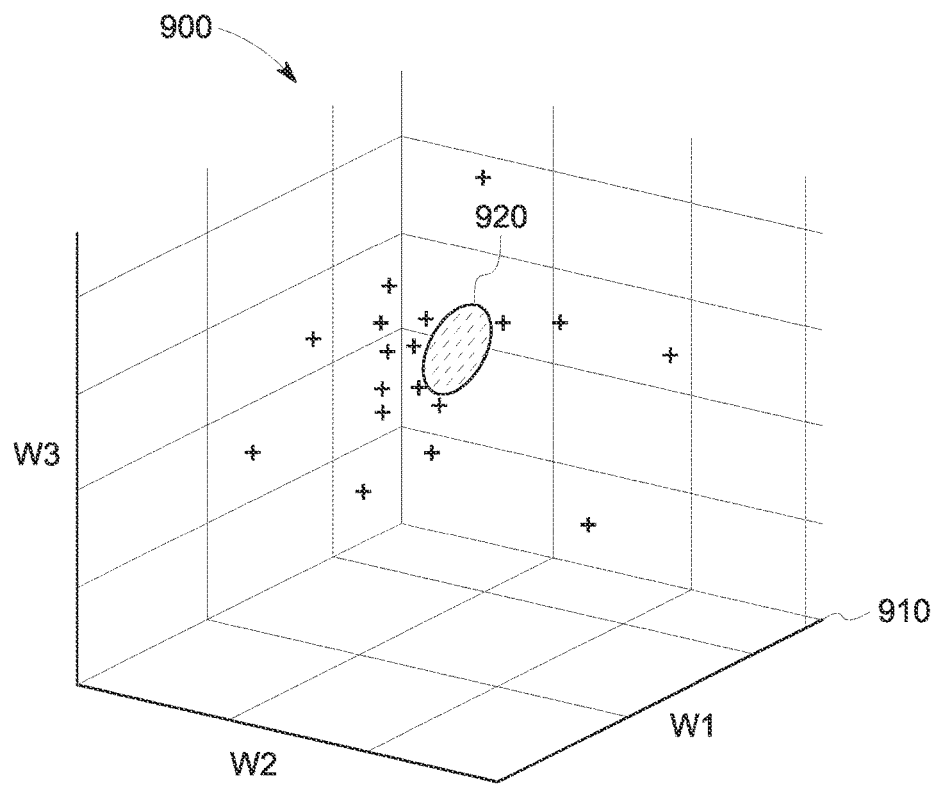
FIG. 9 illustrates three dimensions of sensor outputs in accordance with some embodiments.
Figure 10:
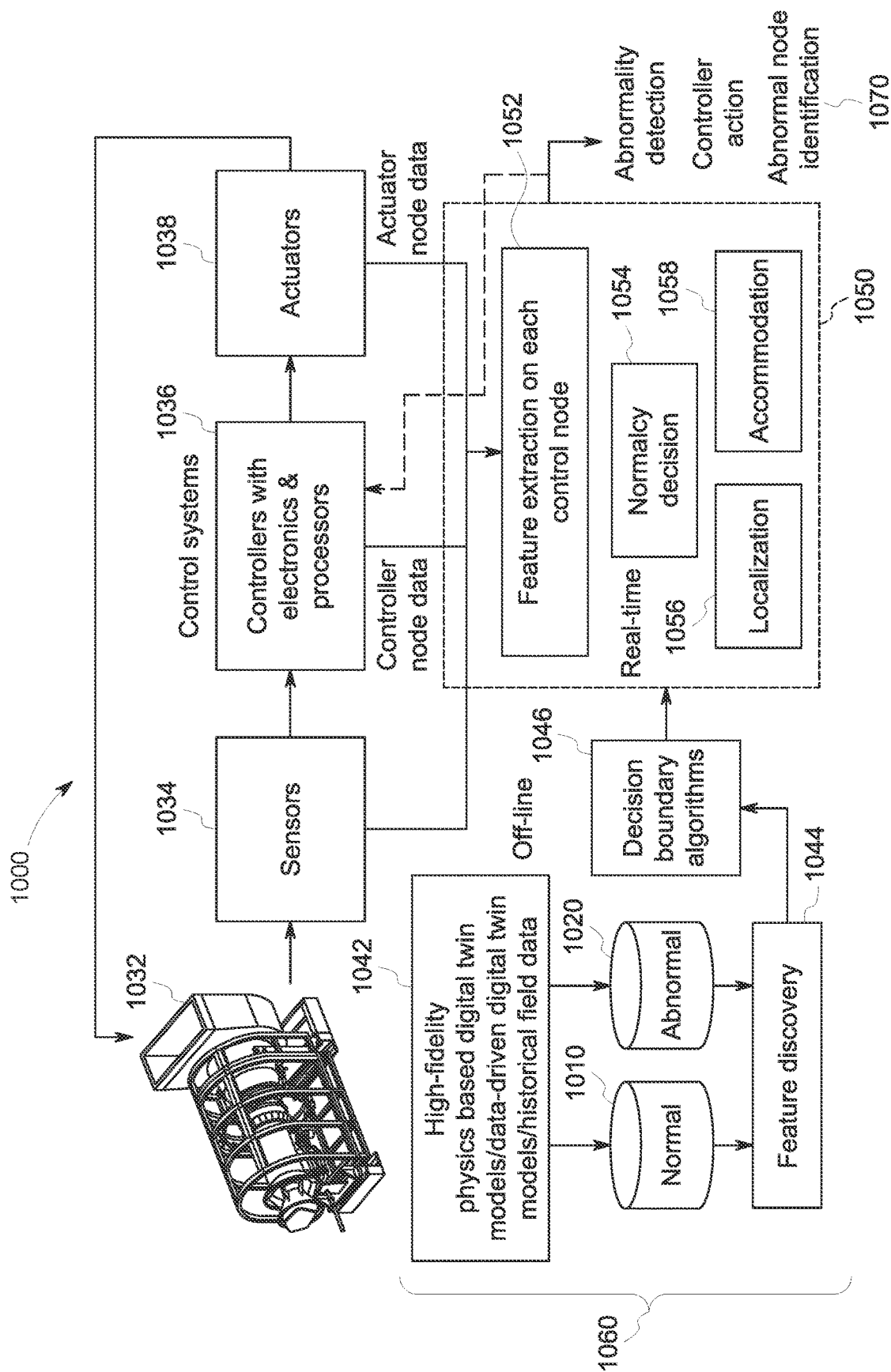
FIG. 10 is an abnormal alert system according to some embodiments.

FIG. 9 illustrates 900 three dimensions of monitoring node outputs in accordance with some embodiments. In particular, a graph 910 plots monitoring node outputs ("+") in three dimensions, such as dimensions associated with Principal Component Features ("PCF"): w1, w2, and w3. Moreover, the graph 910 includes an indication of a normal operating space decision boundary 920. Although a single contiguous boundary 920 is illustrated in FIG. 9, embodiments might be associated with multiple regions. Note that PCF information may be represented as weights in reduced dimensions. For example, data from each monitoring node may be converted to low dimensional features (e.g., weights). According to some embodiments, monitoring node data is normalized as follows:

$$S_{normalized}(k) = \frac{S_{nominal}(k) - S_{original}(k)}{\overline{S}_{nominal}}$$

where S stands for a monitoring node quantity at "k" instant of time. Moreover, output may then be expressed as a weighted linear combination of basis functions as follows:

$$S = S_0 + \sum_{j=1}^{N} w_j \Psi_j$$

where $S_0$ is the average monitoring node output with all threats, $w_j$ is the $j^{th}$ weight, and $\Psi_j$ is the $j^{th}$ basis vector. According to some embodiments, natural basis vectors are obtained using a covariance of the monitoring nodes' data matrix. Once the basis vectors are known, weight may be found using the following equation (assuming that the basis sets are orthogonal):

$$w_j = (S - S_0)^T \Psi_j$$

Note that weights may be an example of features used in a feature vector.

Thus, embodiments may enable the passive detection of indications of multi-class abnormal operations using real-time signals from monitoring nodes. Moreover, the detection framework may allow for the development of tools that facilitate proliferation of the invention to various systems (e.g., turbines) in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new learnings and alternate sources of data become available. As a result, embodiments may detect a relatively wide range of cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to cyber-physical system operators so that an attack may be thwarted (or the effects of the attack may be blunted), reducing damage to equipment.

According to some embodiments, a system may further localize an origin of a threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in a threat alert signal.

Some embodiments of the algorithm may utilize feature-based learning techniques based on high-fidelity physics models and/or machine operation data (which would allow the algorithm to be deployed on any system) to establish a high dimensional decision boundary. As a result, detection may occur with more precision using multiple signals, making the detection more accurate with less false positives. Moreover, embodiments may detect multiple attacks on control signals, and rationalize where the root cause attack originated. For example, the algorithm may decide if a signal is anomalous because of a previous signal attack, or if it is instead independently under attack. This may be accomplished, for example, by monitoring the evolution of the features as well as by accounting for time delays between attacks.

A cyber-attack detection and localization algorithm may process a real-time cyber-physical system signal data stream and then compute features (multiple identifiers) which can then be compared to the signal-specific decision boundary. A block diagram of a system 1000 utilizing a signal-specific cyber-physical system abnormality detection and localization algorithm according to some embodiments is provided in FIG. 10. In particular, a gas turbine 1032 provides information to sensors 1034 which helps controllers with electronics and processors 1036 adjust actuators 1038. A threat detection system 1060 may include one or more high-fidelity physics-based digital-twin models/data-driven digital twin models/historical field data 1042 associated with the turbine 1032 to create normal data 1010 and/or abnormal data 1020. The normal data 1010 and abnormal data 1020 may be accessed by a feature discovery component 1044 and processed by decision boundary algorithms 1046 while off-line (e.g., not necessarily while the gas turbine 1032 is operating). The decision boundary algorithms 1046 may generate an abnormal model including decision boundaries for various monitoring nodes. Each decision boundary may separate two data sets in a high dimensional space which is constructed by running a binary classification algorithm, such as a support vector machine using the normal data 1010 and abnormal data 1020 for each monitoring node signal (e.g., from the sensors 1034, controllers 1036, and/or the actuators 1038).

A real-time threat detection platform 1050 may receive the boundaries along with streams of data from the monitoring nodes. The platform 1050 may include a feature extraction on each monitoring node element 1052 and a normalcy decision 1054 with an algorithm to detect attacks in individual signals using signal specific decision boundaries, as well rationalize attacks on multiple signals, to declare which signals were attacked (or are otherwise abnormal), and which became anomalous due to a previous attack on the system via a localization module 1056. An accommodation element 1058 may generate outputs 1070, such as an anomaly decision indication (e.g., an abnormal) alert signal), a controller action, and/or a list of abnormal monitoring nodes.

During real-time detection, contiguous batches of control signal data may be processed by the platform 1050, normalized and the feature vector extracted. The location of the vector for each signal in high-dimensional feature space may then be compared to a corresponding decision boundary. If it falls within the abnormal region, then a cyber-attack may be declared. The algorithm may then make a decision about where the attack originally occurred. An attack may sometimes be on the actuators 1038 and then manifested in the sensor 1034 data. Attack assessments might be performed in a post decision module (e.g., the localization element 1056) to isolate whether the attack is related to the sensor, controller, or actuator (e.g., indicating which part of the monitoring node). This may be done by individually monitoring, overtime, the location of the feature vector with respect to the hard decision boundary. For example, when a sensor 1034 is spoofed, the attacked sensor feature vector will cross the hard decision boundary earlier than the rest of the vectors as described with respect to FIGS. 11 through 13. If a sensor 1034 is declared to be anomalous, and a command to the auxiliary equipment is later determined to be anomalous, it may be determined that the original attack, such as signal spoofing, occurred on the sensor 1034. Conversely, if the signal to the auxiliary equipment was determined to be anomalous first, and then later manifested in the sensor 1034 feedback signal, it may be determined that the signal to the equipment was initially attacked.

According to some embodiments, it may be detected whether or not a signal is in the normal operating space (or abnormal space) through the use of localized decision boundaries and real-time computation of the specific signal features. Moreover, an algorithm may differentiate between a sensor being attacked as compared to a signal to auxiliary equipment being attacked. The control intermediary parameters and control logical(s) may also be analyzed using similar methods. Note that an algorithm may rationalize signals that become anomalous. An attack on a signal may then be identified.

Figure 11:
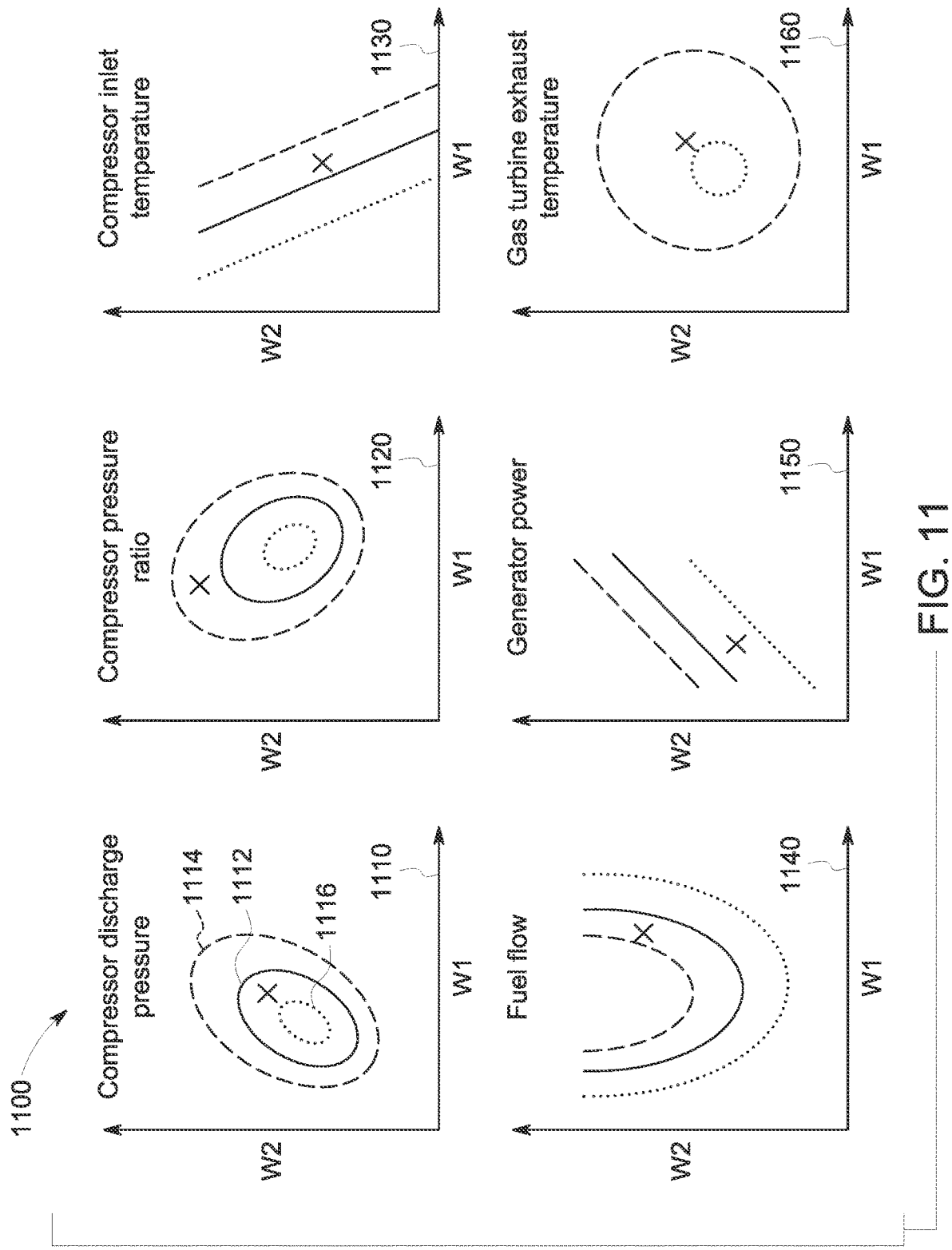
FIGS. 11 through 13 illustrate boundaries and locations of feature vectors for various parameters in accordance with some embodiments.

FIG. 11 illustrates 1100 boundaries and feature vectors for various monitoring node parameters in accordance with some embodiments. In particular, for each parameter a graph includes a first axis representing value weight 1 ("w1"), a feature 1, and a second axis representing value weight 4 ("w2"), a feature 4. Values for w1 and w2 might be associated with, for example, outputs from a Principal Component Analysis ("PCA") that is performed on the input data. PCA might be one of the features that might be used by the algorithm to characterize the data, but note that other features could be leveraged.

A graph is provided for compressor discharge temperature 1110, compressor pressure ratio 1120, compressor inlet temperature 1130, fuel flow 1140, generator power 1150, and gas turbine exhaust temperature 1160. Each graph includes a hard boundary 1112 (solid curve), inner boundary 1116 (dotted curve), and outer boundary 1114 (dashed curve) and an indication associated with current feature location for each monitoring node parameter (illustrated with an "X" on the graphs). As illustrated in FIG. 11, the current monitoring node location is between the minimum and maximum boundaries (that is, the "X" is between the dotted and dashed lines). As a result, the system may determine that the operation of the cyber-physical system control system is normal (and no threat is being detected indicating that the system is currently under attack or that a naturally occurring fault has occurred).

Figure 12:
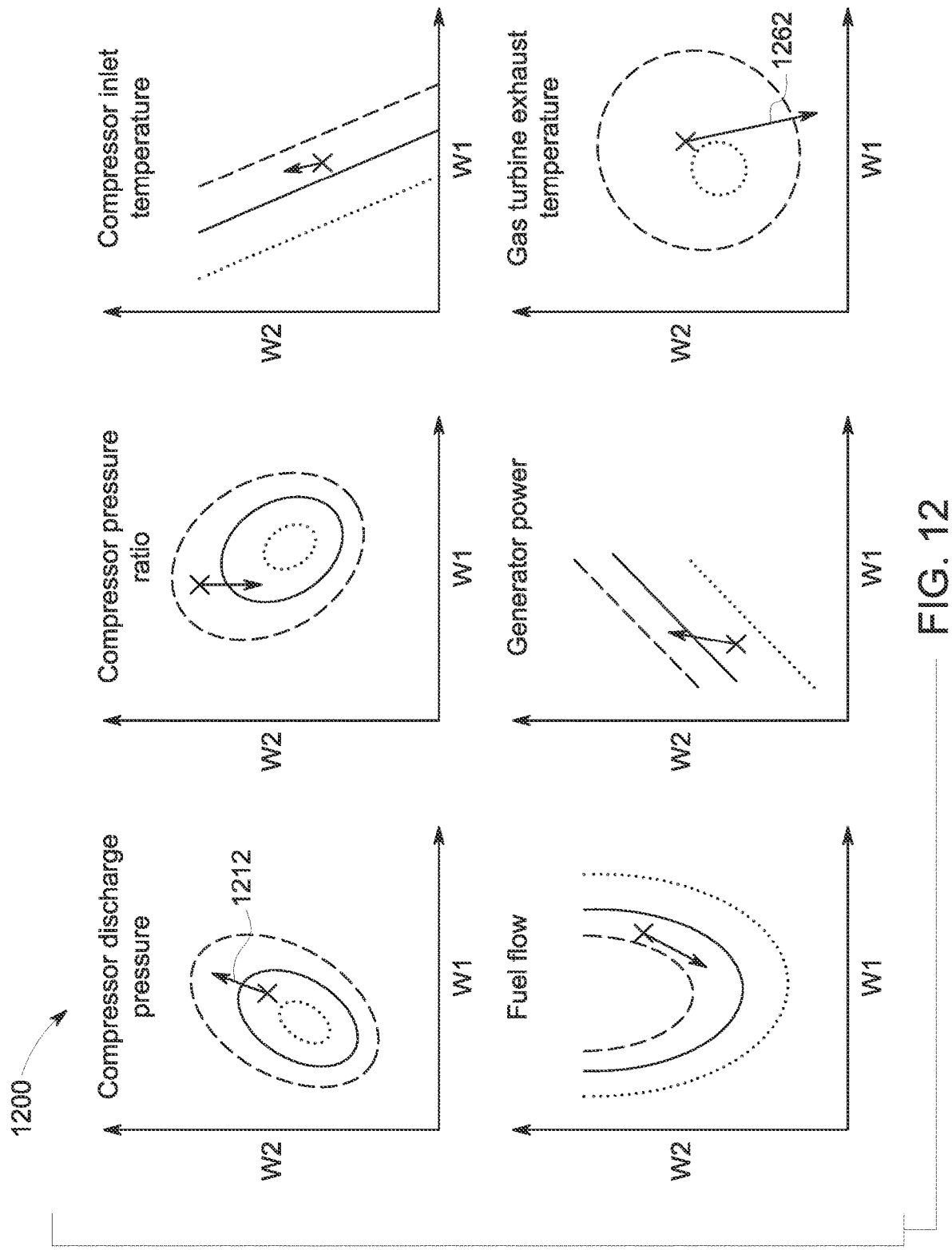

FIG. 12 illustrates 1200 subsequent boundaries and feature vectors for these parameters. Consider, for example, a feature vector movement 1212 for the compressor discharge pressure. Even though feature vector 1212 has moved, it is still within the maximum and minimum boundaries and, as a result, normal operation of that monitoring node may be determined. This is the case for the first five graphs in FIG. 12. In this example, a feature vector movement 1262 for the gas turbine exhaust temperature has exceeded with maximum boundary and, as a result, abnormal operation of that monitoring node may be determined. For example, a threat may exist for the exhaust temperature scale factor, which is a corrective value. The result is that the feature for the intermediary monitoring node signal feature vector illustrated in FIG. 12 moves 1262 such that it is anomalous. The algorithm detects this cyber-attack, and two parallel actions might be initiated. One action may be post processing of the signal to discover what was attacked, in this case if the system has been monitoring each exhaust thermocouple, it may conclude that none of them are currently abnormal. Therefore, it may be determined that something used to calculate this feature was attacked. The other action may be to continually monitor and detect additional attacks. Such an approach may facilitate a detection of multiple signal attacks.

Given the example of FIG. 12, assume that the gas turbine exhaust temperature signal was attacked. This may cause the system to respond in such a way so as to put other signals into an abnormal state. This is illustrated 1300 in FIG. 13, where the attack has already been detected and now other signals shown to be abnormal. In particular, feature movement for the compressor discharge pressure 1312, compressor pressure ratio 1322, compressor inlet temperature 1332, and fuel flow 1342 have all become abnormal (joining the feature vector for the gas turbine exhaust temperature 1362). Note that the feature vector for generator power did not become abnormal. In order to decide whether or not these signals 1312, 1322, 1332, 1342 are truly currently under attack, a historical batch with pertinent feature vector information may be kept for some duration of time. Then when an attack is detected on another signal, this batch is examined, and the time at which the confirmed attack on gas turbine exhaust temperature as well as several subsequent elements is analyzed.

Note that one signal rationalization might be associated with a system time delay. That is, after a sensor is attacked there might be a period of time before the system returns to a steady state. After this delay, any signal that becomes anomalous might be due to an attack as opposed to the system responding.

The current methods for detecting abnormal conditions in monitoring nodes are limited to Fault Detection Isolation and Accommodation ("FDIA"), which itself is very limited. The cyber-attack detection and localization algorithms described herein can not only detect abnormal signals of sensors, but can also detect signals sent to auxiliary equipment, control intermediary parameters and/or control logical (s). The algorithm can also understand multiple signal attacks. One challenge with correctly identifying a cyber-attack threat is that it may occur with multiple sensors being impacted by malware. According to some embodiments, an algorithm may identify in real-time that an attack has occurred, which sensor(s) are impacted, and declare a fault response. To achieve such a result, the detailed physical response of the system must be known to create acceptable decision boundaries. This might be accomplished, for example, by constructing data sets for normal and abnormal regions by running DoE experiments on high-fidelity models. A data set for each sensor might comprise a feature vector for given threat values (e.g., temperature, airflow, etc.). Full factorial, Taguchi screening, central composite and Box-Behnken are some of the known design methodologies used to create the attack space. When models are not available, these DoE methods are also used to collect data from real-world cyber-physical systems. Experiments may be run at different combinations of simultaneous attacks. In some embodiments, the system may detect degraded/faulty operation as opposed to a cyber-attack. Such decisions might utilize a data set associated with a degraded/faulty operating space. At the end of this process, the system may create data sets such as "attack v/s normal" and "degraded v/s normal" for use while constructing decision boundaries. Further note that a decision boundary may be created for each signal using data sets in feature space. Various classification methods may be used to compute decision boundaries. For example, binary linear and non-linear supervised classifiers are examples of methods that could be used to obtain a decision boundary.

Figure 13:
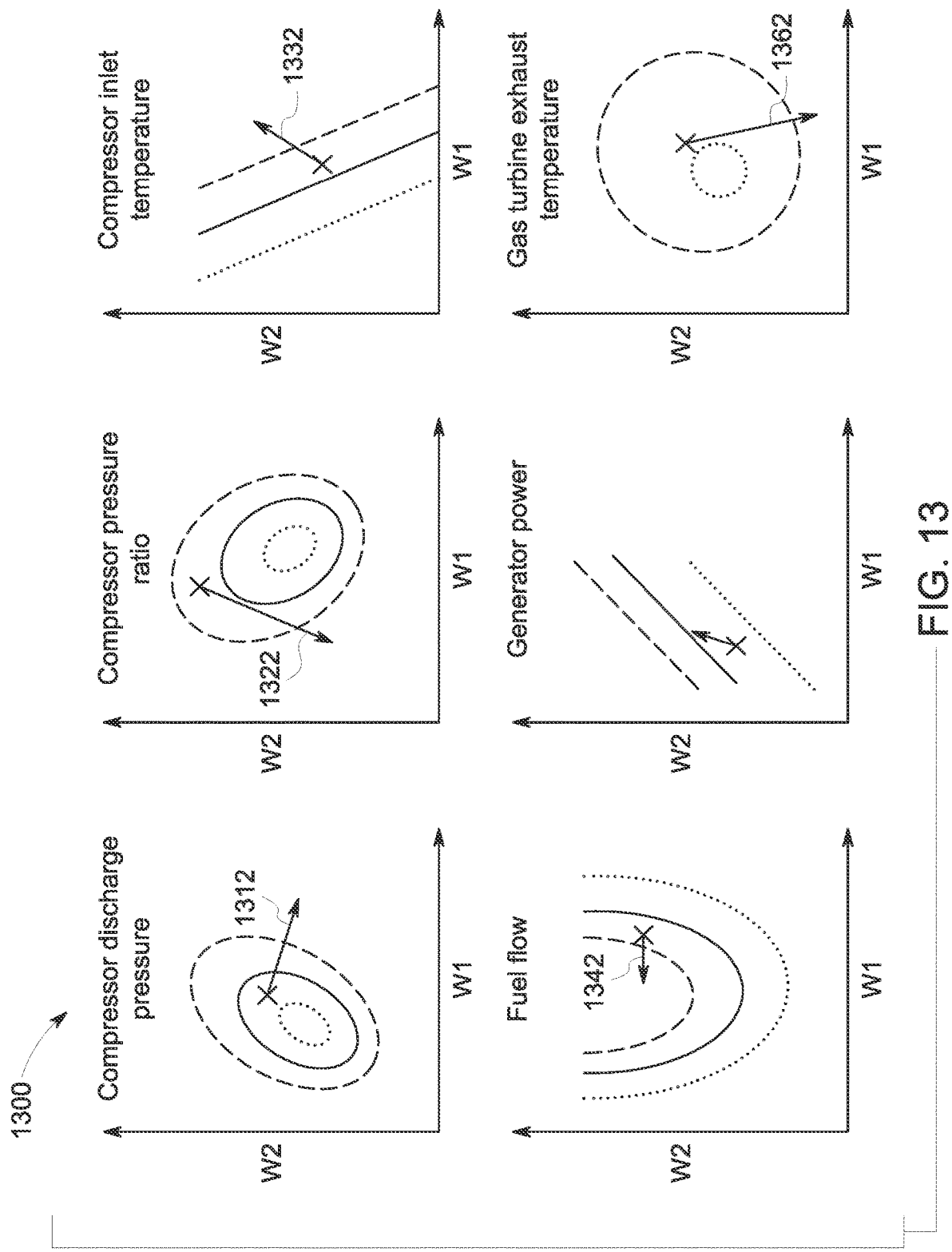

Note that multiple vector properties might be examined, and the information described with respect to FIGS. 11 through 13 may be processed to determine if the signal had been trending in a specific direction as the attack was detected (or if it had just been moving due to noise). Had the signal been uniformly trending as the attack took place and afterward, then this signal is a response to the original attack and not an independent attack.

According to some embodiments, the system may localize or otherwise analyze an origin of the threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in the threat alert signal.

Some embodiments described herein may take advantage of the physics of a cyber-physical system by learning a priori from tuned high-fidelity equipment models and/or actual "on the job" data to detect single or multiple simultaneous adversarial threats to the system. Moreover, according to some embodiments, all monitoring node data may be converted to features using advanced feature-based methods, and the real-time operation of the cyber-physical system may be monitored in substantially real-time. Abnormalities may be detected by classifying the monitored data as being "normal" or disrupted (or degraded). This decision boundary may be constructed using dynamic models and may help to enable early detection of vulnerabilities (and potentially avert catastrophic failures) allowing an operator to restore the cyber-physical system to normal operation in a timely fashion.

Thus, some embodiments may provide an advanced anomaly detection algorithm to detect cyber-attacks on, for example, key cyber-physical system control sensors. The algorithm may identify which signals(s) are being attacked using control signal-specific decision boundaries and may inform a cyber-physical system to take accommodative actions. In particular, a detection and localization algorithm might detect whether a sensor, auxiliary equipment input signal, control intermediary parameter, or control logical are in a normal or anomalous state. Some examples of cyber-physical system monitoring nodes that might be analyzed include: critical control sensors; control system intermediary parameters; auxiliary equipment input signals; and/or logical commands to controller.

A cyber-attack detection and localization algorithm may process a real-time cyber-physical system signal data stream and then compute features (multiple identifiers) which can then be compared to the sensor specific decision boundary. In some embodiments, generating features may involve simply performing an identity transform. That is, the original signal might be used as it is.

Figure 14:
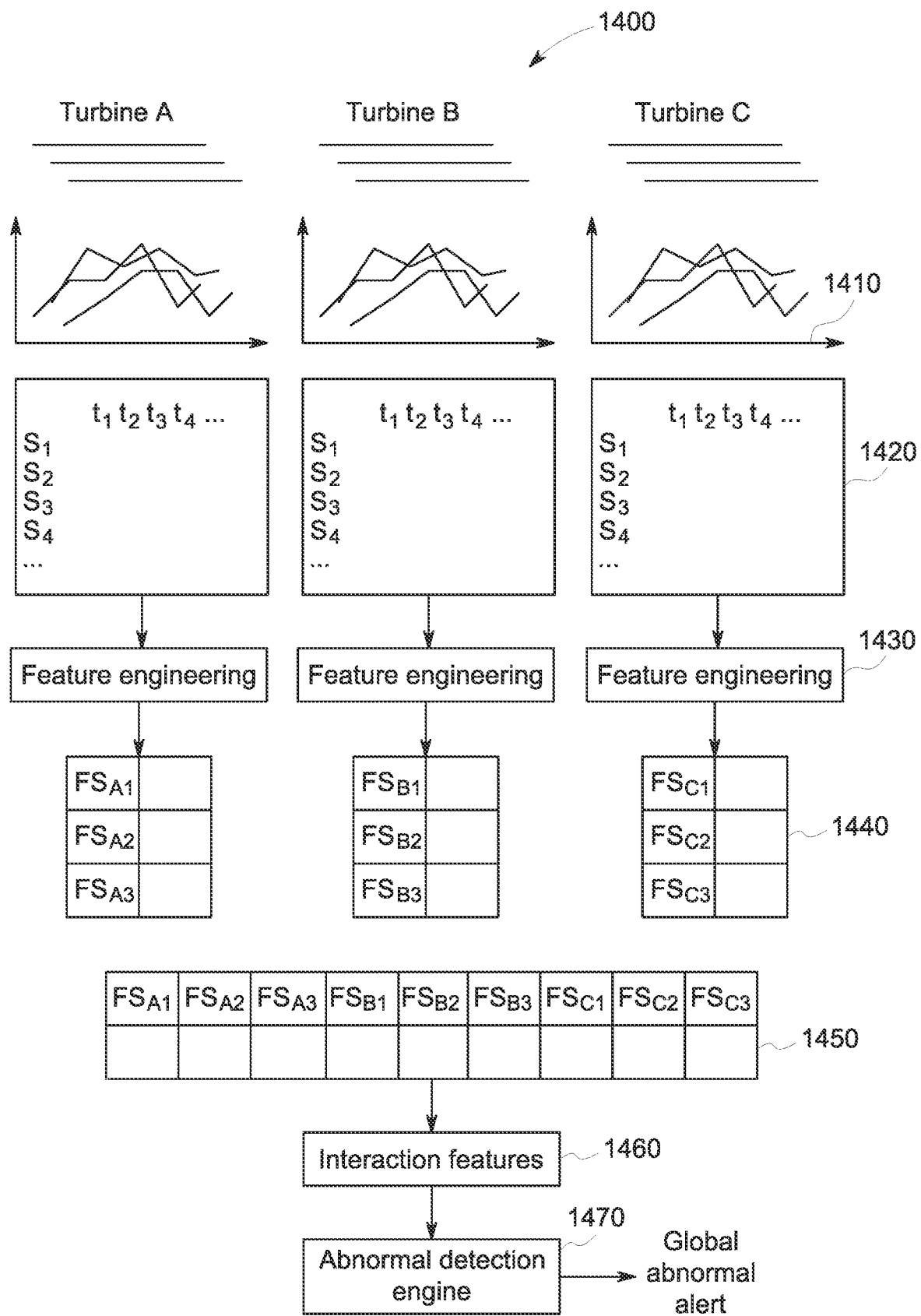
FIG. 14 is an example of a global abnormality protection system in accordance with some embodiments when multiple gas turbines are involved in a system.

Feature vectors may be generated on a monitoring-node-by-monitoring node basis and may be considered "local" to each particular monitoring node. FIG. 14 is an example of a "global" abnormality protection system 1400 in accordance with some embodiments when multiple gas turbines are involved in a system. In particular, the global system 1400 includes three turbines (A, B, and C) and batches of values 1410 from monitoring nodes are collected for each generated over a period of time (e.g., 60 to 80 seconds). The values for each node may be "local" to a given node. According to some embodiments, the batches of values 1410 from monitoring nodes overlap in time. The values 1410 from monitoring nodes may, for example, be stored in a matrix 1420 arranged by time ($t_1$, $t_2$, etc.) and by type of monitoring node ($S_1$, $S_5$, etc.). Feature engineering components 1430 may use information in each matrix 1420 to create a feature vector 1440 (local feature vector) for each of the three turbines (e.g., the feature vector 1440 for turbine C might include $FS_{C1}$, $FS_{C2}$, etc.). The three local feature vectors 1440 may then be combined into a single global feature vector 1450 for the system 1400. Interaction features 1460 may be applied (e.g., associated with A*B*C, A+B+C, etc.) and an anomaly detection engine 1470 may compare the result with a decision boundary and output a global abnormal alert signal when appropriate.

Figure 15:
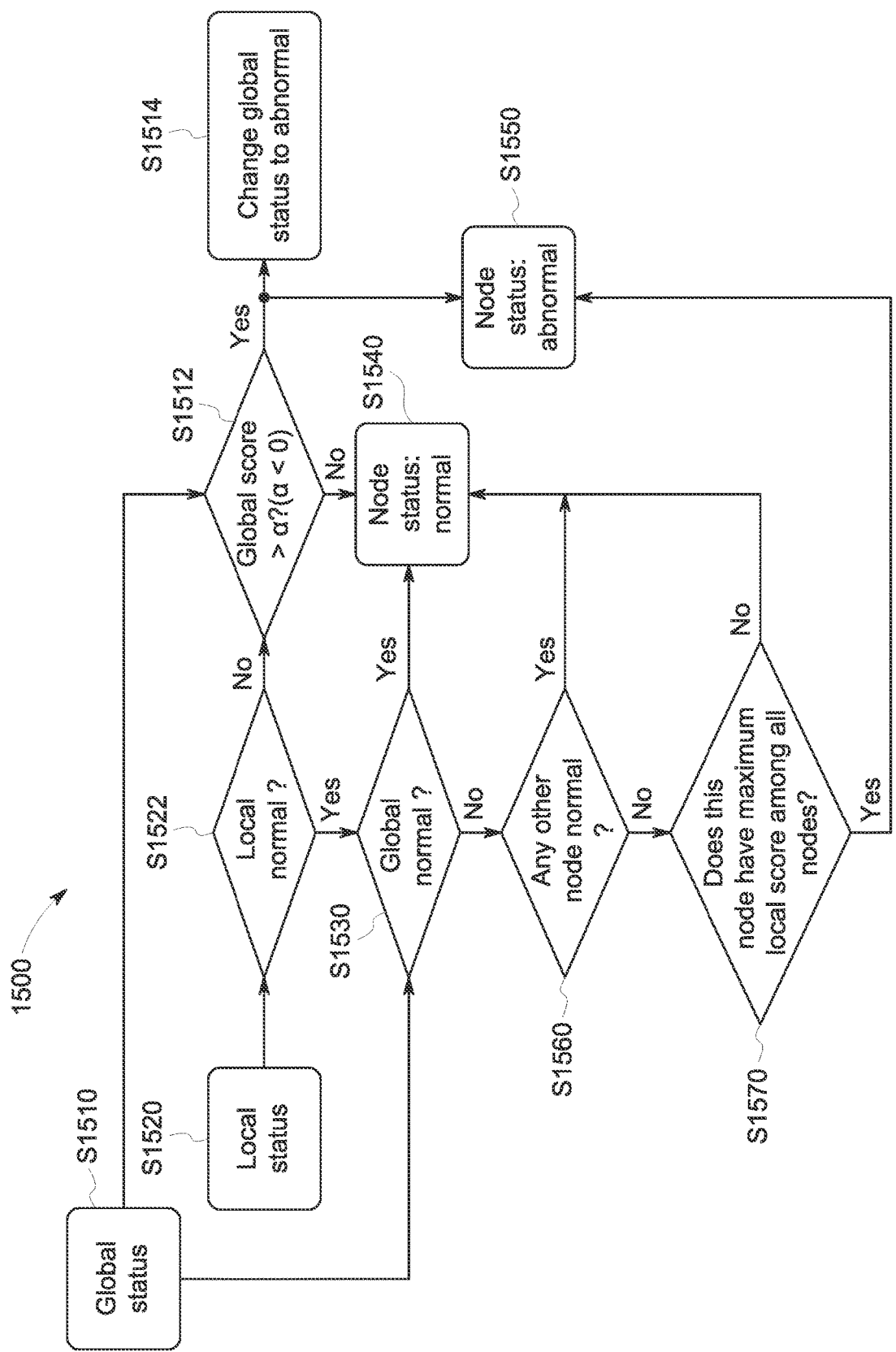
FIG. 15 is a method for detection and localization decision fusion according to some embodiments.

Thus, a system may generate both local normal/abnormal decisions (for each monitoring node) and a global normal/abnormal decision (for the entire cyber-physical system). Note, however, that in both cases false positive and false negative decisions may occur. As a result, the local decisions and global decisions might provide contradictory information (e.g., a local monitoring node might be declared abnormal while the entire system is declared normal). To address this situation, some embodiments described herein "fuse" the local and global decisions in a consistent fashion. For example, FIG. 15 is a method 1500 for detection and localization decision fusion according to some embodiments. At S1520 a global status is determined for a cyber-physical system (along with a global certainty score indicating how likely it is that the that system is "abnormal") and at S1520 local statuses are determined (along with local certainty scores on a none-by-node basis). If both a local status is "normal" at S1522 and the global status is normal at S1530, the node status remains normal at S1540 (that is, there is no conflicting information). If the global status is "normal" (e.g., associated with a negative anomaly score) while a local status of any of the nodes is "abnormal" at 1522, there is a conflict. As a result, the system compares a global certainty score to a pre-determined tuning parameter $\alpha$ at 1512. If the global certainty store is greater than a at 1512, the global status is changed to "abnormal" at S1514 (and that node remains "abnormal" at S1550)—otherwise, the global status and local status remain "normal" at S1540. The tuning parameter $\alpha$ may act as a threshold on the proximity of the global features to the global decision boundary.

If the global status is "abnormal" and a particular node's status is "normal" at S1530, it is determined if any other node in the system is "abnormal" at S1560. If so, there is no conflict (that is, the other node with an "abnormal" status is causing the global abnormality) and neither status needs to be changed. If the global status is "abnormal" and all local statuses (for all monitoring nodes) are "normal" there is a conflict. In this case, the node with the maximum local certainty score at S1570 is declared to be "abnormal" at S1550. The local scores may be normalized to become comparable. In this way, embodiments described herein may provide systems and methods to fuse the outcomes of abnormality detection and localization modules in order to make them coordinated and consistent.

As described above, embodiments may increase efficiency and accuracy by having abnormality detection and localization modules run in parallel. Since each of those methods provide an independent decision, which in practice may not be always correct (due false alarms and false negatives of each), embodiments described herein may fuse the decisions and make them consistent at all times. Note that the parallel execution of detection and localization modules may make them faster, more accurate, and enable parallel computing for computational efficiency. It may also provide two independent sources of decision. The decision fusion makes the two modules consistent and the overall decision more accurate as compared to each individual one.

According to some embodiments, the local certainty scores may be normalized (e.g., into a probability) to be comparable with each other. For example, the normalization might be performed via any appropriate smooth activation function, sigmoid function (a mathematical function having a characteristic S-shaped curve), hyperbolic tangent function (tan h), etc.

Figure 16:
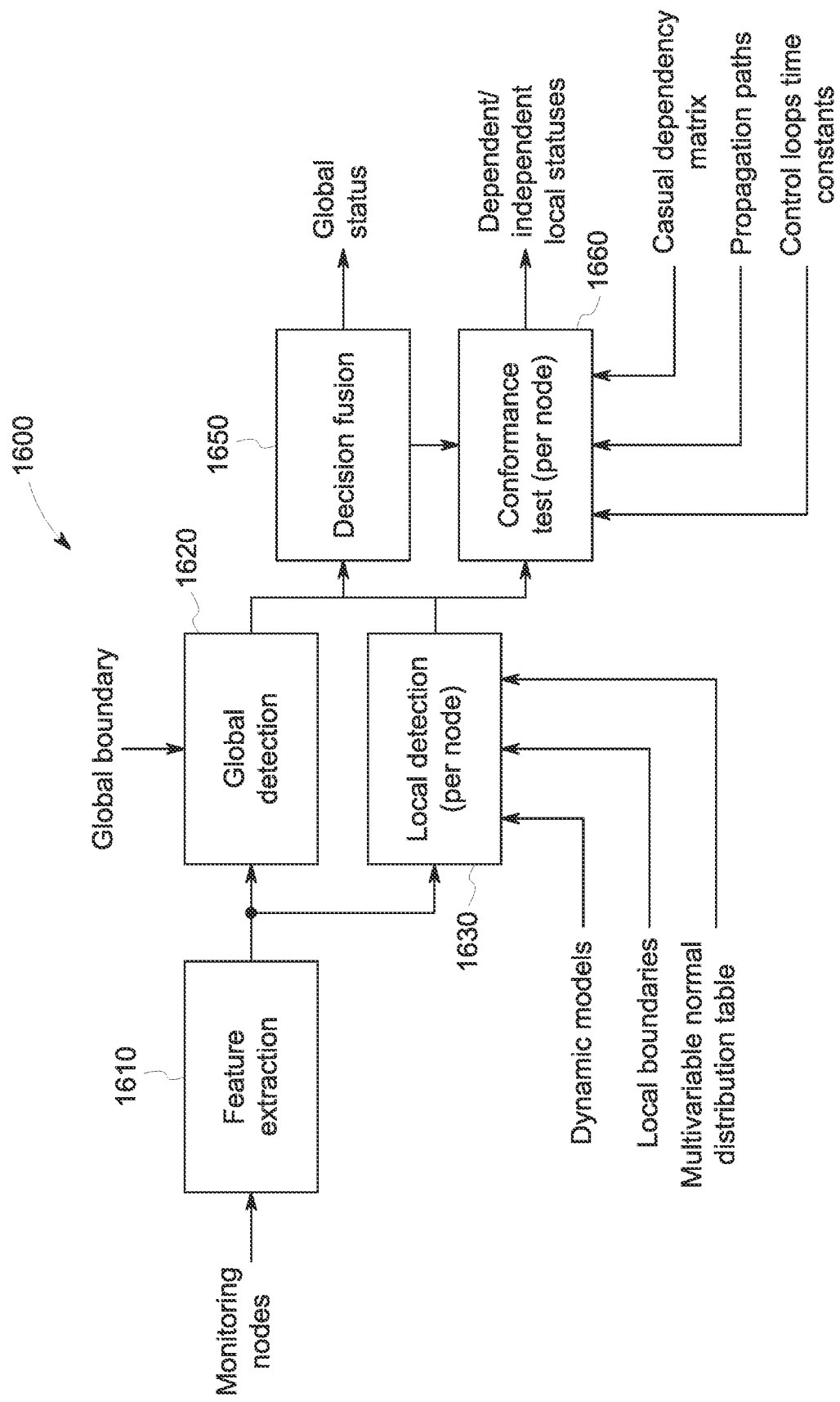
FIG. 16 is a detection and localization system architecture according to some embodiments.

FIG. 16 is a detection and localization system architecture 1600 according to some embodiments. After feature extraction 1610 is performed on monitoring node data, the result is provided to global detection 1620 and local detection 1630. The global detection 1620 uses the features and a global decision boundary to determine an initial global status. The local detection 1630 uses dynamic models, local boundaries, and a multivariable normal distribution table to determine initial local statuses on a node-by-node basis. The decisions from the global detection 1620 and local detection 1630 undergo decision fusion 1650 to generate fused global and local statuses.

Figure 17:
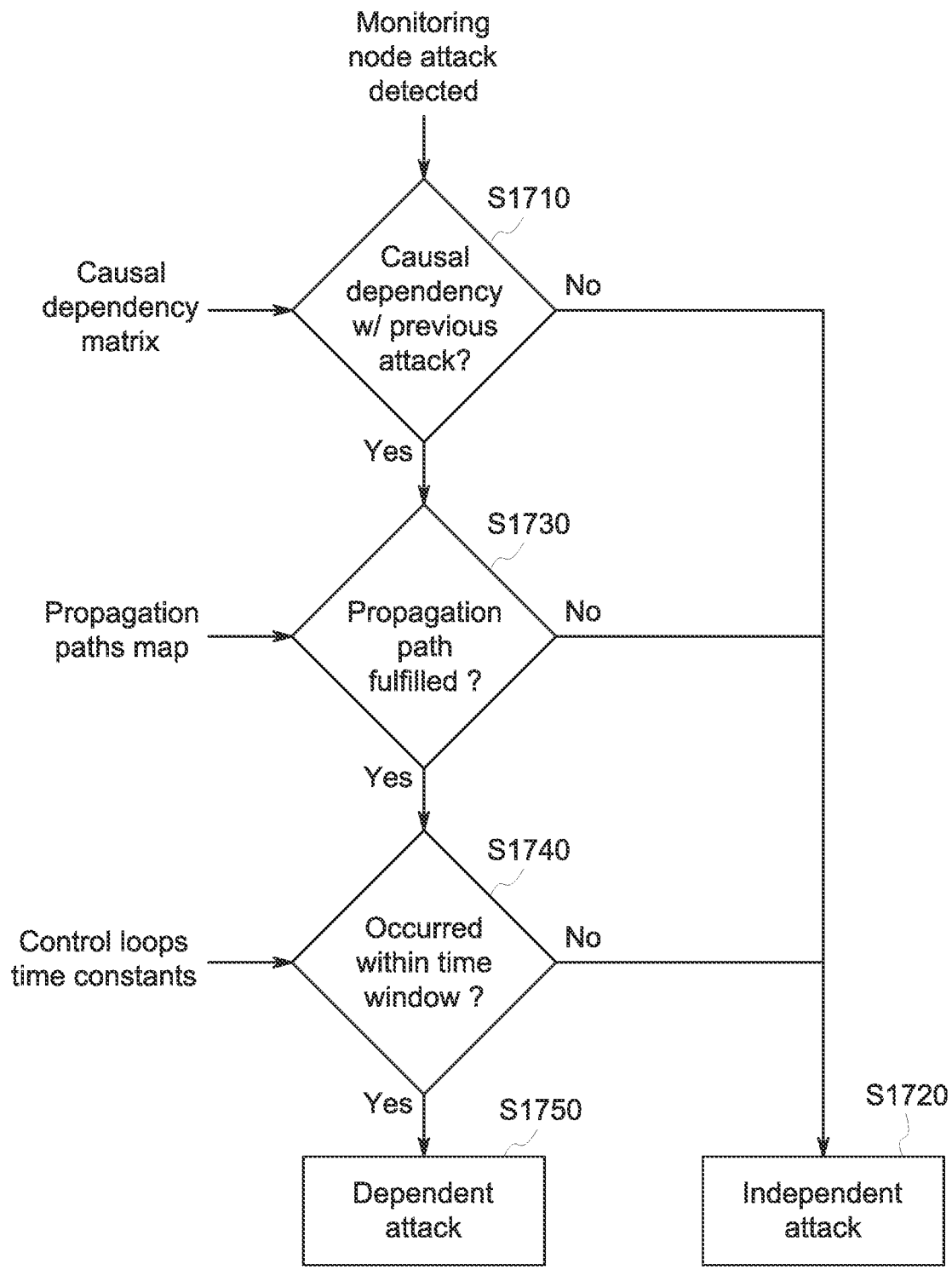
FIG. 17 is a method of determining whether an attack is an independent attack or dependent attack in accordance with some embodiments.

According to some embodiments, a conformance test 1660 may further determine (on a node-by-node basis) whether an abnormal local status is "independent" or "dependent" (likely caused by an abnormality existing at another monitoring node) based on a casual dependency matrix, propagation paths, control loops time constraints, etc. For example, FIG. 17 is a method of determining whether an attack is an independent attack or dependent attack in accordance with some embodiments. According to some embodiments, three tests may be performed to determine if an attack should be classified as an "independent attack" or a "dependent attack:" (1) a causal dependency test, (2) a propagation path test, and (3) a time separation test. Together, these three tests may be referred to herein as an "attack dependency conformance test." At S1710, a causal dependency matrix may be used to determine if the current attack was potentially caused by a previous attack. If the current attack could not have been caused by a previous attack at S1710, it is classified as an "independent attack" at S1720. In this causality test, the system may check whether there is a potential causal dependency between the newly detected attack and any previously detected attack on other monitoring nodes. This check might be based on, for example, a binary matrix of causal dependencies between any two nodes. The causal dependency matrix might be generated, according to some embodiments, based on domain knowledge. If no such possible dependencies exist the attack is reported as an "independent attack" at S1720. Otherwise, the system may perform a second check.

At S1730 a propagation paths map may be used to determine if the current attack potentially propagated from a previous attack. If the current attack could not have propagated from a previous attack at S1730, it is classified as an "independent attack" at S1720. In this propagation test, for each causal dependency the system may check whether a propagation path is fulfilled. This might mean that, for example, if the effect of node 1 being under attack is propagated to node 4, through node 3, then an anomaly in node 1 can cause an anomaly on node 4 only if node 3 is already anomalous. The anomaly propagation paths might also be defined by domain knowledge and pre-stored in the localization system. If no such propagation paths are fulfilled, then the attack is reported an "independent attack" at S1720. Otherwise, the system may perform the third check.

At S1740, control loops time constraints may be used to determine if the current attack was potentially caused by a previous attack based on time separation. If the current attack could not have been caused by a previous attack based on time separation at S1740, it is classified as an "independent attack" at S1720. This time separation test may utilize the fact that if the attacked monitoring under investigation is an artifact of the closed-loop feedback system, then the effect should arise within a time window between the rise time and the settling time of the control loop corresponding to the monitoring node. However, since the system uses a dynamic estimator, a propagation time may need to be added throughout the estimator. Using n features, and p lags in the models, the dynamic estimator will have n*p states, and therefore adds n*p sampling times delay into the system. Therefore, the expected time window for a dependent attack to occur might be defined by:

$$1.5*\tau + n*p < \Delta t < 5*\tau + n*p$$

where $\Delta t$ is the time after any previously detected attacks on other nodes that has passed checks 1 and 2, and $\tau$ is the time constant of the control loop responsible for the current node under investigation. If such a time-separation check is not passed, the system reports the attack as an independent attack at S1720. In order the get accurate time instances of the status change events, the module 1660 may also receive pre-fused node status and scores from 1630.

If it is determined at S1750 that the current attack meets the time separation test (and, therefore, also meets both the propagation test of S1730 and the causal dependency test of S1740), the current attack is classified as a "dependent attack" at S1750.

Note that other attack and anomaly detection techniques may only provide a binary status of the overall system (whether it is under attack or not). Embodiments described herein may also provide an additional layer of information by localizing the attack and determining not only if the system is under attack (or not) but also which node is exactly under attack. Note that attack localization information may be important when responding to the attack, including operator action plans and resilient control under attack. Embodiments described herein may handle multiple simultaneous anomalies in the system, which is beyond the capability of the conventional fault detection systems. This may also let the approaches described herein be used as a fault detection and isolation technique for more sophisticated, multiple-fault scenarios. Further, distributed detection and localization systems enabled by embodiments described herein across multiple equipment and systems may allow for a coordination of data to detect and precisely pin-point coordinated multi-prong attacks. This may further enable a relatively quick way to perform forensics and/or analysis after an attack.

Note that some embodiments may analyze information in the feature space, which has many advantages over working in the original signal spaces, including high-level data abstraction and modeling high dimensional spaces without adding substantial computational complexity. The feature-based method for localization may also extend feature vectors and/or incorporate new features into existing vectors as new learnings or alternate sources of data become available. Embodiments described herein may also enable use of heterogeneous sensor data in a large scale interconnected system, even when the data comes from many geospatially located heterogeneous sensors (i.e., conventional plant sensors, unconventional sensors such as cell-phone data, logical, etc.). This may offer additional commercial advantages for post-mortem analysis after an attack.

Figure 18:
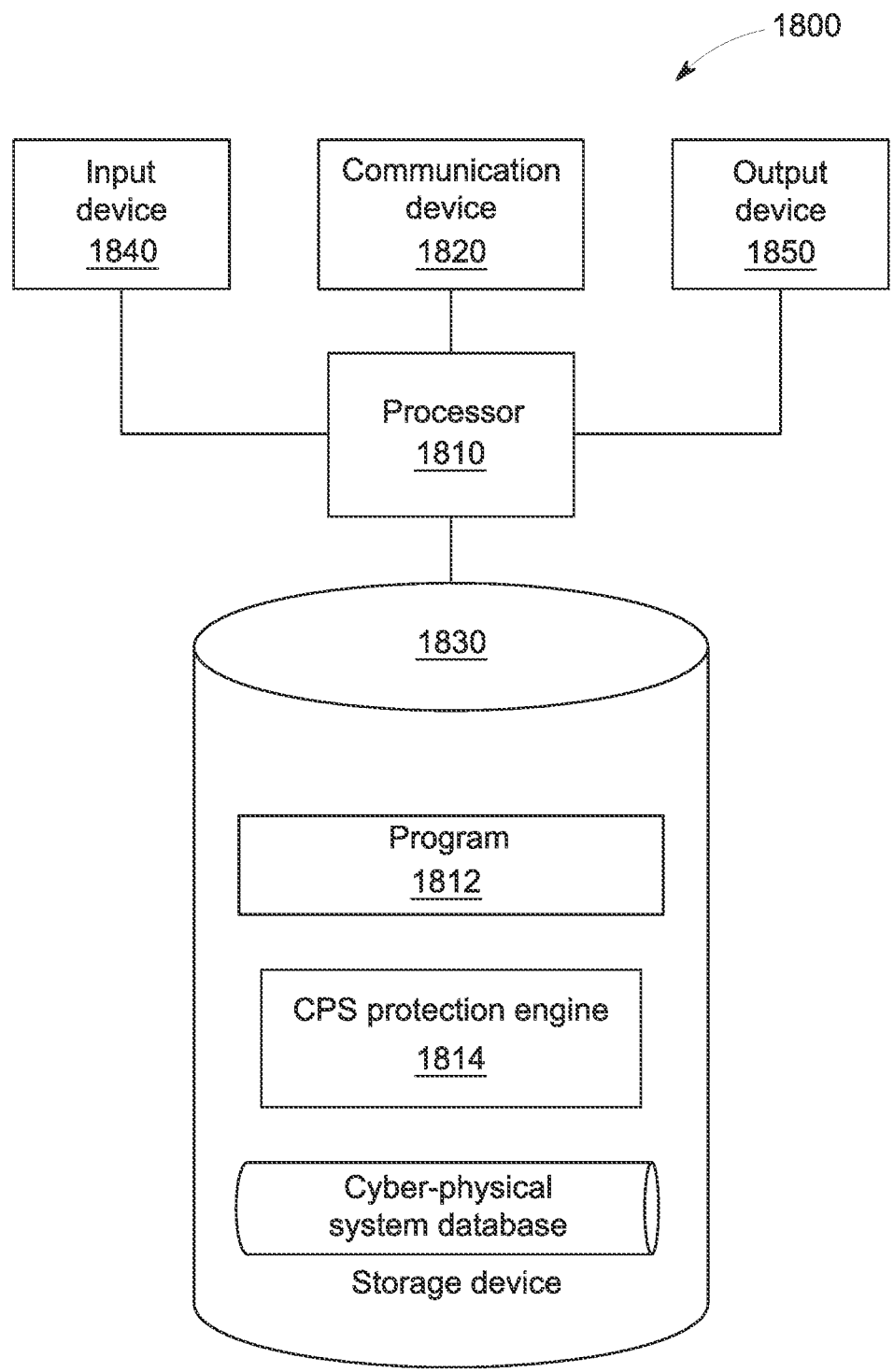
FIG. 18 is a cyber-physical system protection platform according to some embodiments.

Note that the embodiments described herein may be implemented using any number of different hardware configurations. For example, FIG. 18 is a block diagram of a cyber-physical system protection platform 1800 that may be, for example, associated with the systems 100, 300 of FIGS. 1 and 3, respectively, and/or any other system described herein. The cyber-physical system protection platform 1800 comprises a processor 1810, such as one or more commercially available Central Processing Units ("CPUs") in the form of one-chip microprocessors, coupled to a communication device 1820 configured to communicate via a communication network (not shown in FIG. 18). The communication device 1820 may be used to communicate, for example, with one or more remote monitoring nodes, user platforms, digital twins, etc. The cyber-physical system protection platform 1800 further includes an input device 1840 (e.g., a computer mouse and/or keyboard to input cyber-physical system parameters and/or modeling information) and/an output device 1850 (e.g., a computer monitor to render a display, provide alerts, transmit recommendations, and/or create reports). According to some embodiments, a mobile device, monitoring physical system, and/or PC may be used to exchange information with the cyber-physical system protection platform 1800.

The processor 1810 also communicates with a storage device 1830. The storage device 1830 may comprise any appropriate information storage device, including combinations of magnetic storage devices (e.g., a hard disk drive), optical storage devices, mobile telephones, and/or semiconductor memory devices. The storage device 1830 stores a program 1812 and/or cyber-physical system protection engine 1814 for controlling the processor 1810. The processor 1810 performs instructions of the programs 1812, 1814, and thereby operates in accordance with any of the embodiments described herein. For example, the processor 1810 may receive a selection of method to train an agent, may train the agent per the selected method, and then execute the agent to determine whether a monitoring node, or the cyber-physical system has a status of "normal" or "abnormal". The processor 1810 may then output the determined status to a user interface or other system.

The programs 1812, 1814 may be stored in a compressed, uncompiled and/or encrypted format. The programs 1812, 1814 may furthermore include other program elements, such as an operating system, clipboard application, a database management system, and/or device drivers used by the processor 1810 to interface with peripheral devices.

As used herein, information may be "received" by or "transmitted" to, for example: (i) the cyber-physical system protection platform 1800 from another device; or (ii) a software application or module within the cyber-physical system protection platform 1800 from another software application, module, or any other source.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). Moreover, although some embodiments are focused on gas turbines, any of the embodiments described herein could be applied to other types of cyber-physical systems including power grids, dams, locomotives, airplanes, and autonomous vehicles (including automobiles, trucks, drones, submarines, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system to protect a cyber physical system, comprising:
   a plurality of real-time monitoring nodes to receive streams of monitoring node signal values over time that represent a current operation of the cyber physical system; and
   a threat detection computer platform comprising:
     a local status determination module comprising an ensemble of local agents, the ensemble of local agents including two or more pluralities of local agents, wherein each plurality of local agents determines a local normal/abnormal status for a respective node of the plurality of real-time monitoring nodes, and the local status determination module is adapted to determine an anomaly status for the plurality of real-time monitoring nodes, wherein each local agent is trained with data representing a different mode of operation of the plurality of real-time monitoring nodes, and wherein each real-time monitoring node is one of a sensor, an actuator, a controller, a component and a sub-system;
     a global status determination module comprising an ensemble of global agents, wherein each global agent monitors a portion of the cyber physical system and the global status determination module is adapted to determine an anomaly status for the cyber physical system;
     a memory storing instructions; and
     a computer processor to execute the instructions to cause the threat detection computer platform to:
       receive the monitoring node signal values,
       generate feature vectors from the received monitoring node signal values;
       fuse, via a first status fusion module, global agent output from a plurality of global agents, the fusion generating a final global system status indicating a global normal/abnormal decision for the cyber physical system, wherein each global agent outputs its own respective anomaly status based on a comparison of global agent-specific feature vectors of the generated feature vectors to a global agent-specific decision boundary, wherein the fusion is: 1 A rule-based fusion including at least one of majority voting and dynamic detection selection, or 2 a machine-learning (ML)-based fusion;

fuse, via a second status fusion module, local agent output from each respective plurality of local agents, the fusion generating a final local node status for the respective node indicating a local normal/abnormal decision for the respective node, wherein each local agent outputs its own respective anomaly status based on a comparison of local agent-specific feature vectors of the generated feature vectors to a local agent-specific decision boundary, wherein the fusion is: 1. a rule-based fusion including at least one of majority voting and dynamic detection selection, or 2. a machine-learning (ML)-based fusion;

receive at a decision fusion module: 1 the final local node status for each respective node, and 2 the final global system status;

fuse, via the decision fusion module, the final local node status for each monitoring node and the final global system status for the cyber physical system; and wherein each of the local status determination module, the global status determination module and the decision fusion module is a software module.

2. The system of claim 1, wherein each local agent is adapted to determine a confidence score for their own respective anomaly status.

3. The system of claim 1, wherein each global agent is adapted to determine the anomaly status for a mode or a region of operation of the cyber physical system.

4. The system of claim 1, wherein each local agent and each global agent is trained to detect an anomaly via one of a two-class supervised learning process and a one-class learning process.

5. The system of claim 4, wherein the two-class supervised learning process is based on one of a physics-based digital twin learning process and a data-driven digital twin learning process, and each of the physics-based digital twin learning process and the data-driven digital twin learning process generates simulation training data to train the respective process.

6. The system of claim 1, wherein at least two of the plurality of local agents are developed by at least two of a physics-based method, a data-driven method and a one-class method, and at least two agents of the plurality of global agents are developed by at least two of the physics-based method the data-driven method and the one-class method.

7. The system of claim 1, wherein each local agent is adapted to generate a confidence score for the determined anomaly status.

8. The system of claim 1, wherein:
two or more local agents of the ensemble of the local status determination module are adapted to transfer information with each other; and
two or more global agents of the ensemble of the global status determination module are adapted to transfer information with each other.

9. A method to protect a cyber physical system comprising:
providing a local status determination module comprising an ensemble of local agents, the ensemble of local agents including two or more pluralities of local agents, wherein each plurality of local agents determines a local normal/abnormal status for a respective node of a plurality of real-time monitoring nodes;
providing a global status determination module comprising an ensemble of global agents, wherein each global agent monitors a portion of the cyber physical system;
receiving a stream of monitoring node signal values from a plurality of real-time monitoring nodes, wherein the monitoring node signal values represent a current operation of the cyber physical system;
generating feature vectors from the received monitored node signal values;
determining, via the local status determination module, an anomaly status for the plurality of real-time monitoring nodes, wherein each local agent is trained with data representing a different mode of operation of the plurality of real-time monitoring nodes, and wherein each real-time monitoring node is one of a sensor, an actuator, a controller, a component, and a sub-system;
determining, via the global status determination module, an anomaly status for the cyber physical system;
fusing, via a first status fusion module, global agent output from a plurality of global agents, the fusion generating a final global system status indicating a global normal/abnormal decision for the cyber physical system, wherein each global agent outputs its own respective anomaly status based on a comparison of global agent-specific feature vectors of the generated feature vectors to a global agent-specific decision boundary, wherein the fusion is: 1. a rule-based fusion including at least one of majority voting and dynamic detection selection, or 2. a machine-learning (ML)-based fusion;
fusing, via a second status fusion module, local agent output from each respective plurality of local agents, the fusion generating a final local node status for the respective node indicating a local normal/abnormal decision for the respective node, wherein each local agent outputs its own respective anomaly status based on a comparison of local agent-specific feature vectors of the generated feature vectors to a local agent-specific decision boundary, wherein the fusion is: 1. a rule-based fusion including at least one of majority voting and dynamic detection selection, or 2. a machine-learning (ML)-based fusion;
receiving at a decision fusion module: 1. the final local node status for each respective node, and 2. the final global system status;
fusing, via the decision fusion module, the final node status for each monitoring node and the final global system status for the cyber physical system; and
wherein each of the local status determination module, the global status determination module and the decision fusion module is a software module.

10. The method of claim 9, further comprising:
determining, by each local agent, a confidence score for their own respective anomaly status.

11. The method of claim 9, further comprising:
determining, by each global agent, the anomaly status for a mode of operation of the cyber physical system.

12. The method of claim 9, wherein each local agent and each global agent is trained to detect an anomaly via one of a two-class supervised learning process and a one-class learning process.

13. The method of claim 12, wherein the supervised learning process is one of a physics-based digital twin learning process and a data-driven digital twin learning process, and each of the physics-based digital twin learning process and the data-driven digital twin learning process generates simulation training data to train the respective process.

14. A non-transitory, computer-readable medium storing program code, the program code executable by a computer processor to cause the processor to perform a method to protect a cyber physical system associated with a plurality of monitoring nodes, each generating a series of current monitoring node values over time that represent a current operation of the cyber physical system, the method comprising:
generating feature vectors from a plurality of received monitoring node signal values;
determining, via a local status determination module comprising an ensemble of local agents, the ensemble of local agents including two or more pluralities of local agents, wherein each plurality of local agents determines a local normal/abnormal status for a respective node of a plurality of real-time monitoring nodes, an anomaly status for the plurality of monitoring nodes, wherein each local agent is trained with data representing a different mode of operation of the plurality of monitoring nodes, and wherein each monitoring node is one of a sensor, an actuator, a controller, a component and a sub-system;
determining, via a global status determination module comprising an ensemble of global agents, wherein each global agent monitors a portion of the cyber physical system, an anomaly status for the cyber physical system;
fusing, via a first status fusion module, global agent output from a plurality of global agents, the fusion generating a final global system status indicating a global normal/abnormal decision for the cyber physical system, wherein each global agent outputs its own respective anomaly status based on a comparison of global agent-specific feature vectors of the generated feature vectors to a global agent-specific decision boundary, wherein the fusion is: 1 A rule-based fusion including at least one of majority voting or dynamic detection selection, or 2 a machine-learning (ML)-based fusion;
fusing, via a second status fusion module, local agent output from each respective plurality of local agents, the fusion generating a final local node status for the respective node indicating a local normal/abnormal decision for the respective node, wherein each local agent outputs its own respective anomaly status based on a comparison of local agent-specific feature vectors of the generated feature vectors to a local agent-specific decision boundary, wherein the fusion is: 1 a rule-based fusion including at least one of majority voting or dynamic detection selection, or 2 a machine-learning (ML)-based fusion;
receiving at a decision fusion module: 1 the final local node status for each respective node, and 2 The final global system status;
fusing, via the decision fusion module, the final node status for each monitoring node and the final global system status for the cyber physical system; and
wherein each of the local status determination module, the global status determination module and the decision fusion module is a software module.

15. The medium of claim 14, further comprising:
determining, by each local agent, a confidence score for their own respective anomaly status.

16. The medium of claim 15, further comprising:
determining, by each global agent, the anomaly status for a mode a region of operation of the cyber physical system.

17. The medium of claim 16, wherein each local agent and each global agent is trained to detect an anomaly via one of a two-class supervised learning process and a one-class learning process.

* * * * *